(12) United States Patent
Kenna

(10) Patent No.: US 11,840,013 B2
(45) Date of Patent: Dec. 12, 2023

(54) GRAPHITE MATERIALS AND DEVICES WITH SURFACE MICRO-TEXTURING

(71) Applicant: Matthews International Corporation, Pittsburgh, PA (US)

(72) Inventor: John Kenna, Surrey (CA)

(73) Assignee: Matthews International Corporation, Pittsburgh, PA (US)

( * ) Notice: Subject to any disclaimer, the term of this patent is extended or adjusted under 35 U.S.C. 154(b) by 1177 days.

(21) Appl. No.: 16/287,638

(22) Filed: Feb. 27, 2019

(65) Prior Publication Data

US 2019/0263048 A1 Aug. 29, 2019

Related U.S. Application Data

(60) Provisional application No. 62/636,152, filed on Feb. 27, 2018.

(51) Int. Cl.
| | |
|---|---|
| *B29C 59/02* | (2006.01) |
| *B29C 59/00* | (2006.01) |
| *H01M 8/0258* | (2016.01) |
| *H01M 8/0213* | (2016.01) |
| *B29K 507/04* | (2006.01) |
| *B29L 31/34* | (2006.01) |
| *F28F 21/02* | (2006.01) |
| *B29L 31/18* | (2006.01) |

(52) U.S. Cl.
CPC .......... *B29C 59/022* (2013.01); *B29C 59/005* (2013.01); *F28F 21/02* (2013.01); *H01M 8/0213* (2013.01); *H01M 8/0258* (2013.01); *B29C 2059/023* (2013.01); *B29K 2507/04* (2013.01); *B29L 2031/18* (2013.01); *B29L 2031/3468* (2013.01)

(58) Field of Classification Search
CPC ....... B29C 59/02; B29C 59/04; B29C 59/002; B29C 59/005; B29C 2059/023; B29K 2507/04; B29L 2031/18; B29L 2031/3468
See application file for complete search history.

(56) References Cited

U.S. PATENT DOCUMENTS

| | | |
|---|---|---|
| 3,404,061 A | 10/1968 | Shane et al. |
| 3,494,382 A | 2/1970 | Shane et al. |
| 4,723,783 A | 2/1988 | Belter et al. |
| 4,849,858 A | 7/1989 | Grapes et al. |
| 4,867,235 A | 9/1989 | Grapes et al. |

(Continued)

OTHER PUBLICATIONS

Qiao et al., "Microembossing of ultrafine grained Al: Microstructural analysis and finite element modelling", Proceedings of the 12th International Conference on Aluminium Alloys, Sep. 5-9, 2010, Yokohama, Japan, pp. 1255-1260.

(Continued)

*Primary Examiner* — Jerzi H Moreno Hernandez
(74) *Attorney, Agent, or Firm* — DLA Piper LLP

(57) ABSTRACT

Flexible graphite and other graphite materials with surface micro-texturing, and methods and apparatuses for micro-texturing the surface of flexible graphite and other graphite materials are provided. Micro-texturing can be used to modify wettability and/or adhesion characteristics of a flexible graphite surface. Micro-textured flexible graphite materials can be advantageously used in applications where the material is in contact with liquid water or other liquids.

14 Claims, 27 Drawing Sheets

(56) References Cited

U.S. PATENT DOCUMENTS

| | | |
|---|---|---|
| 5,149,518 A | 9/1992 | Mercuri et al. |
| 5,834,337 A | 11/1998 | Unger et al. |
| 5,928,807 A | 7/1999 | Elias |
| 6,060,166 A | 5/2000 | Hoover et al. |
| 6,245,400 B1 | 6/2001 | Tzeng et al. |
| 6,413,663 B1 | 7/2002 | Mercuri |
| 6,413,671 B1 | 7/2002 | Mercuri et al. |
| 6,432,336 B1 | 8/2002 | Mercuri et al. |
| 6,468,686 B1 | 10/2002 | Mercuri et al. |
| 6,479,182 B1 | 11/2002 | Mercuri |
| 6,503,626 B1 | 1/2003 | Norley et al. |
| 6,503,652 B2 | 1/2003 | Reynolds, III et al. |
| 6,506,484 B1 | 1/2003 | Mercuri et al. |
| 6,517,964 B2 | 2/2003 | Mercuri |
| 6,521,369 B1 | 2/2003 | Mercuri et al. |
| 6,523,608 B1 | 2/2003 | Solbrekken et al. |
| 6,528,199 B1 | 3/2003 | Mercuri et al. |
| 6,548,156 B2 | 4/2003 | Mercuri et al. |
| 6,604,457 B2 | 8/2003 | Klug |
| 6,605,379 B1 | 8/2003 | Mercuri et al. |
| 6,613,252 B2 | 9/2003 | Norley et al. |
| 6,620,506 B2 | 9/2003 | Mercuri et al. |
| 6,649,102 B2 | 11/2003 | Davis et al. |
| 6,663,807 B2 | 12/2003 | Klug |
| 6,673,284 B2 | 1/2004 | Mercuri et al. |
| 6,673,289 B2 | 1/2004 | Reynolds, III et al. |
| 6,702,970 B2 | 3/2004 | Klug |
| 6,706,400 B2 | 3/2004 | Mercuri et al. |
| 6,716,381 B2 | 4/2004 | Klug |
| 6,746,771 B2 | 6/2004 | Ottinger et al. |
| 6,749,010 B2 | 6/2004 | Getz, Jr. et al. |
| 6,797,091 B2 | 9/2004 | Lines et al. |
| 6,818,165 B2 | 11/2004 | Gallagher |
| 6,858,282 B2 | 2/2005 | Temme |
| 6,884,745 B2 | 4/2005 | Yazici et al. |
| 6,902,841 B2 | 6/2005 | Mercuri et al. |
| 6,911,276 B2 | 6/2005 | Extrand |
| 6,923,631 B2 | 8/2005 | Mercuri et al. |
| 6,960,402 B2 | 11/2005 | Yazici et al. |
| 7,108,917 B2 | 9/2006 | Klug |
| 7,182,898 B2 | 2/2007 | Klug |
| 7,186,309 B2 | 3/2007 | Mercuri et al. |
| 7,232,601 B2 | 6/2007 | Mercuri et al. |
| 7,280,359 B2 | 10/2007 | Fujiwara |
| 7,341,781 B2 | 3/2008 | Klug |
| 7,393,587 B2 | 7/2008 | Krassowski et al. |
| 7,420,810 B2 | 9/2008 | Reis et al. |
| 7,470,468 B2 | 12/2008 | Mercuri et al. |
| 7,758,783 B2 | 7/2010 | Shi et al. |
| 8,034,662 B2 | 10/2011 | Touzelbaev et al. |
| 8,067,091 B2 | 11/2011 | Brunovska et al. |
| 8,270,170 B2 | 9/2012 | Hughes et al. |
| 8,382,004 B2 | 2/2013 | Asmussen et al. |
| 8,408,039 B2 | 4/2013 | Cao et al. |
| 8,537,553 B2 | 9/2013 | Mohammed et al. |
| 8,905,748 B2 | 12/2014 | Cao et al. |
| 8,916,269 B2 | 12/2014 | Brunovska et al. |
| 8,923,360 B2 | 12/2014 | Coleman et al. |
| 9,140,362 B2 | 9/2015 | Potier |
| 9,700,968 B2 | 7/2017 | Kenna et al. |
| 9,706,684 B2 | 7/2017 | Kenna |
| 2002/0164483 A1 | 11/2002 | Mercuri et al. |
| 2002/0167109 A1* | 11/2002 | Klug ............... B29C 59/04 264/175 |
| 2002/0168526 A1 | 11/2002 | Mercuri et al. |
| 2002/0197476 A1 | 12/2002 | Mercuri et al. |
| 2003/0051797 A1 | 3/2003 | Lines et al. |
| 2004/0072055 A1 | 4/2004 | Getz et al. |
| 2004/0121122 A1 | 6/2004 | Reynolds, III et al. |
| 2004/0241397 A1 | 12/2004 | Klug et al. |
| 2005/0104243 A1 | 5/2005 | Mercuri et al. |
| 2005/0175838 A1 | 8/2005 | Greinke et al. |
| 2005/0189673 A1 | 9/2005 | Klug et al. |
| 2005/0208165 A1 | 9/2005 | Mercuri et al. |
| 2006/0068205 A1 | 3/2006 | Potier |
| 2006/0070720 A1 | 4/2006 | Capp et al. |
| 2006/0225874 A1 | 10/2006 | Shives et al. |
| 2007/0053168 A1 | 3/2007 | Sayir et al. |
| 2007/0158050 A1 | 7/2007 | Norley et al. |
| 2008/0160284 A1 | 7/2008 | Mercuri et al. |
| 2008/0186419 A1 | 8/2008 | Kim et al. |
| 2009/0208882 A1* | 8/2009 | Schmid ............... B29C 59/021 430/324 |
| 2009/0301697 A1 | 12/2009 | Hirose |
| 2011/0287203 A1* | 11/2011 | Victor ............... B29C 59/022 264/293 |
| 2012/0052241 A1* | 3/2012 | King ............... B08B 17/06 264/293 |
| 2012/0061135 A1 | 3/2012 | Hill et al. |
| 2012/0087094 A1 | 4/2012 | Hill et al. |
| 2013/0099013 A1 | 4/2013 | Asmussen et al. |
| 2013/0242573 A1 | 9/2013 | Petrsoki et al. |
| 2013/0284737 A1 | 10/2013 | Ju et al. |
| 2014/0209565 A1* | 7/2014 | Nakamura ............ B29C 59/002 264/219 |
| 2014/0217575 A1 | 8/2014 | Hung |
| 2014/0287239 A1 | 9/2014 | Scurati et al. |
| 2015/0075762 A1 | 3/2015 | Narendra et al. |
| 2015/0189792 A1 | 7/2015 | Kenna et al. |
| 2016/0079144 A1 | 3/2016 | Scurati et al. |
| 2017/0006736 A1 | 1/2017 | Kenna |
| 2017/0067701 A1 | 3/2017 | Sun et al. |
| 2017/0157895 A1 | 6/2017 | Groll et al. |
| 2017/0348811 A1 | 12/2017 | Kenna et al. |

OTHER PUBLICATIONS

Ng et al., "Improving Surface Hydrophobicity by Microrolling-based Texturing", Journal of Micro and Nano-Manufacturing, Sep. 2016, vol. 4(4), pp. 031001-2-031001-8.

Wang et al., "Fast patterned graphene ribbons via soft-lithography", 18th CIRP Conference on Electro Physical and Chemical Machining (ISEM XVIII), Procedia CIRP 42, 2016, pp. 428-432.

* cited by examiner $\rho = 0.46 \text{ g/cm}^3$ $\rho = 1.02 \text{ g/cm}^3$

GRAPHITE MATERIALS AND DEVICES WITH SURFACE MICRO-TEXTURING

CROSS-REFERENCE TO RELATED APPLICATIONS

This application is related to and claims priority from U.S. provisional application 62/636,152 having a filing date of Feb. 27, 2018 entitled "Graphite Materials and Devices with Surface Micro-Texturing". The '152 application is hereby incorporated by reference herein in its entirety.

FIELD OF THE INVENTION

The present invention relates to graphite materials with surface micro-texturing, and to methods and apparatuses for micro-texturing the surface of graphite materials, for example, to modify or tune surface characteristics of the material, such as wettability and/or adhesion characteristics. Such micro-textured graphite materials can be advantageously used in applications where the material is in contact with liquid water or other liquids. The invention also relates to flexible graphite materials that are micro-textured by embossing.

Flexible graphite sheet material can be obtained by first intercalating graphite with an intercalating agent to form a graphite intercalation compound that is then exposed to a thermal shock, for example, at a temperature of 700° C.-1,050° C. for a short duration of time (20-60 seconds) to expand or exfoliate the graphite. The exfoliated graphite particles are vermiform in appearance and are commonly referred to as "worms". The worm is essentially a network of interconnected, thin graphite flakes, with pores present between flakes that make the worms compressible. The worms can be re-compressed together into flexible sheets (foils or films), referred to as "flexible graphite" or "exfoliated graphite sheet" or "graphite sheet" that can be wound up on a drum to form a roll. U.S. Pat. No. 3,404,061 describes the preparation of flexible graphite from expanded or exfoliated graphite particles.

Most of the graphite flakes in flexible graphite are oriented parallel to the two opposed major exterior surfaces. Although flexible graphite is typically highly electrically conductive in the in-plane directions (typically around 1,300 S/cm), the through-plane electrical conductivity of flexible graphite is significantly less (often only about 15 S/cm). The anisotropy ratio, the ratio of highest electrical conductivity to lowest conductivity value, is typically as high as 86:1 (and often higher than this value). The thermal properties of flexible conventional flexible graphite are similarly highly anisotropic with the in-plane thermal conductivity being many times greater than the through-plane thermal conductivity.

The properties of flexible graphite (such as its density, flexibility and its electrical and thermal conductivity) can be adjusted by incorporating a resin during forming of the material and/or impregnating it with a resin or another suitable impregnation medium after it is formed. The impregnation medium at least partially fills the pores between the graphite flakes. Resins suitable for impregnation of flexible graphite include phenolic, furan, epoxy and acrylic resins.

Flexible graphite materials are increasingly being used in a variety of applications, including in applications where the material comes into contact with water vapor and/or liquid water and/or other vapors or liquids. For example, flexible graphite flow field plates are used in heat exchangers and in fuel cells. Perforated sheets of flexible graphite have also been used as electrodes in fuel cells. For many of these applications the flexible graphite is typically embossed with channels or other macro features.

In applications where the flexible graphite comes into contact with water or another liquid, the wettability characteristics of the surface of the material can be important. For some applications, flexible graphite is coated or impregnated with another material in order to change its wettability characteristics.

As an example, one limiting factor in the use of flexible graphite sheets in PEM (polymer electrolyte membrane) fuel cells, particularly at the cathode where water is generated, is the relative hydrophilicity of flexible graphite, as compared to other materials. The accumulation of water at or in the electrodes or flow field plates can reduce the performance of the fuel cell by causing "flooding" of the cathode. U.S. Pat. No. 6,605,379 describes the use of a perforated flexible graphite electrode for a fuel cell. The electrode is coated or impregnated with a water resistant additive hydrophobic additive to render it more hydrophobic (relative to the untreated flexible graphite), thereby reducing the tendency of flexible graphite layer to flood when utilized as the cathode in a PEM fuel cell. Similarly, in U.S. Patent Application Publication No. 2004/0121122 describes a flexible graphite sheet that can be used as an electrode or a gas diffusion layer in a fuel cell. The flexible graphite sheet has a hydrophobic binder and a carbonaceous material adhered to it for improved water management.

Thus, for some applications a hydrophobic coating and/or additive is used to modify the wettability characteristics of flexible graphite. In other situations, it is desirable to render the surface of the flexible graphite more hydrophilic, and in these instances a hydrophilic coating and/or additive is typically used.

However, the use of coatings and/or additives to modify the wettability characteristics of flexible graphite can, in some cases, detract from or diminish other properties of flexible graphite that are desirable for a particular end-use application, such as its high thermal and/or electrical conductivity.

SUMMARY OF THE INVENTION

The present application relates to flexible graphite and other graphite materials with surface micro-texturing, and to methods and apparatuses for micro-texturing the surface of flexible graphite or other graphite materials. In at least some embodiments, such micro-texturing can be used to change the wettability characteristics (for example, hydrophobicity or hydrophilicity) of the surface of the material. In at least some embodiments, such micro-textured flexible graphite and/or other graphite materials can be advantageously used in applications where the material is in contact with liquid water or other liquids. In at least some embodiments, micro-texturing can be used to tune or modify the adhesion or friction coefficients of the surface, for example, for tribological applications.

In some embodiments, a method for making a material or article comprises micro-texturing at least a portion of at least one major surface of a graphite material, such as a flexible graphite material, with an array of features. In at least some embodiments, at least one dimension of the features and/or the spacing between the features is less than 100 μm. In some embodiments, a lateral dimension of the features, their depth or height, and the spacing between them are less than 100 μm. In some embodiments, at least one dimension of the features, or the spacing between them, is in the range between and inclusive of about 10 μm to about 100 μm. In some embodiments, at least one dimension of the features, or the spacing between them, is in the range between and inclusive of about 10 μm to about 50 μm. In some embodiments, the depth or height of the features is in the range between and inclusive of about 15 μm to about 50 μm, and the spacing between them is in the range between and inclusive of about 15 μm to about 25 μm.

In some embodiments, the micro-texturing process comprises embossing the at least a portion of the at least one major surface of a flexible graphite with an array of features. In some embodiments, the embossing is performed using a die. In some embodiments, the embossing is performed using a wafer die. In some embodiments, the embossing is performed using an embossing device.

In some embodiments, micro-texturing is used to increase the hydrophobicity of at least a portion of at least one major surface of the flexible graphite material. In some embodiments, the contact angle of a water droplet on the flexible graphite material prior to the micro-texturing is less than 70°, and the contact angle of a water droplet on at least a portion of at least one major surface of the flexible graphite material that is micro-textured with the array of features is greater than 90°.

Some embodiments of the method comprise, prior to micro-texturing the flexible graphite material, reducing the roughness of the at least a portion of at least one major surface of the flexible graphite material that is to be micro-textured by pressing the flexible graphite material against a smooth surface. In some exemplary embodiments, this can comprise calendaring the flexible graphite material between a pair of smooth rollers and/or compressing the flexible graphite material using a smooth die.

In some embodiments, a method for making a material or article comprises embossing at least a portion of at least one major surface of a flexible graphite sheet material with an array of features, using a roller embosser patterned with an array of features or a die patterned with an array of features, wherein at least one dimension of the features and the spacing between the features is less than 100 μm. In some embodiments, a micro-textured graphite material is made by this method.

In some embodiments, a micro-textured flexible graphite material comprises an array of features formed on at least a portion of at least one major surface thereof, wherein at least one dimension of the features and/or the spacing between the features is less than 100 μm. In some embodiments, a lateral dimension of the features, their depth or height, and the spacing between them are less than 100 μm. In some embodiments, at least one dimension of the features, or the spacing between them, is in the range between and inclusive of about 10 μm to about 100 μm. In some embodiments, at least one dimension of the features, or the spacing between them, is in the range between and inclusive of about 10 μm to about 50 μm. In some embodiments, a depth or height of the features is in the range between and inclusive of about 15 μm to about 50 μm, and the spacing between them is in the range between and inclusive of about 15 μm to about 25 μm.

In some embodiments of the above-described methods and micro-textured graphite materials, the graphite material consists essentially of graphite.

In some embodiments of the above-described methods and micro-textured graphite materials, the graphite material comprises a resin.

Some embodiments of the above-described methods further comprise forming the micro-textured material into a component of a fuel cell, such as a fuel cell flow field plate or an electrode.

Some embodiments of the above-described methods further comprise forming the micro-textured material into a component of a heat exchanger or heat sink, such as a fluid flow field plate or a fin.

Some embodiments of the above-described methods further comprise forming the micro-textured material into a three-dimensional structure, for example, by bending, folding and/or corrugating.

In some embodiments, graphite materials components or devices are selectively micro-textured with different texturing patterns in different regions in order to impart different wettability, adhesion and/or friction characteristics in different regions of the component or device.

In some embodiments, micro-textured graphite sheet materials prepared using the methods described herein, or devices or components made therefrom, or portions thereof, are impregnated with a resin after micro-texturing.

In some embodiments, a mixture of graphite particles and resin is prepared, micro-textured and then the resin is cured.

In some embodiments, micro-textured graphite sheet materials prepared using the above-described methods, or devices or components made therefrom, or portions thereof, are coated with a coating in one or more regions.

DETAILED DESCRIPTION OF ILLUSTRATIVE EMBODIMENTS

Flexible graphite and other graphite materials with surface micro-texturing, and methods and apparatuses for micro-texturing the surface of flexible graphite and other graphite materials are described. Micro-texturing of the surface can be used to tune or modify its wettability characteristics (relative to the untextured material), for example, for applications where the material is in contact with liquid water or other liquids, and/or for self-cleaning applications. It can also be used to tune or modify the adhesion and/or friction coefficients of the surface, for example, for tribological applications.

Surface roughness can have a significant effect on the degree of surface wetting. It has been generally observed that, under some circumstances, roughness can cause liquid to adhere more strongly to the surface than to a corresponding smooth surface. Under other circumstances, however, roughness can cause the liquid to adhere less strongly to the rough surface than the smooth surface.

Surfaces that are resistant to wetting by liquids are commonly referred to as "lyophobic" surfaces, and when the liquid is water are commonly referred to as "hydrophobic" surfaces. If a surface resists wetting to an extent that a small droplet of water or other liquid exhibits a very high stationary contact angle with the surface (greater than about 120 degrees), if the surface exhibits a markedly reduced propensity to retain liquid droplets, and/or if a liquid-gas-solid interface exists at the surface when completely submerged in liquid, the surface can be referred to as an "ultralyophobic" or "ultrahydrophobic" surface, or just an ultraphobic surface. Ultraphobic surfaces generally take the form of a substrate with a multiplicity of microscale to nanoscale protrusions and/or cavities, referred to herein as "features".

Contact Angles

Figure 1:
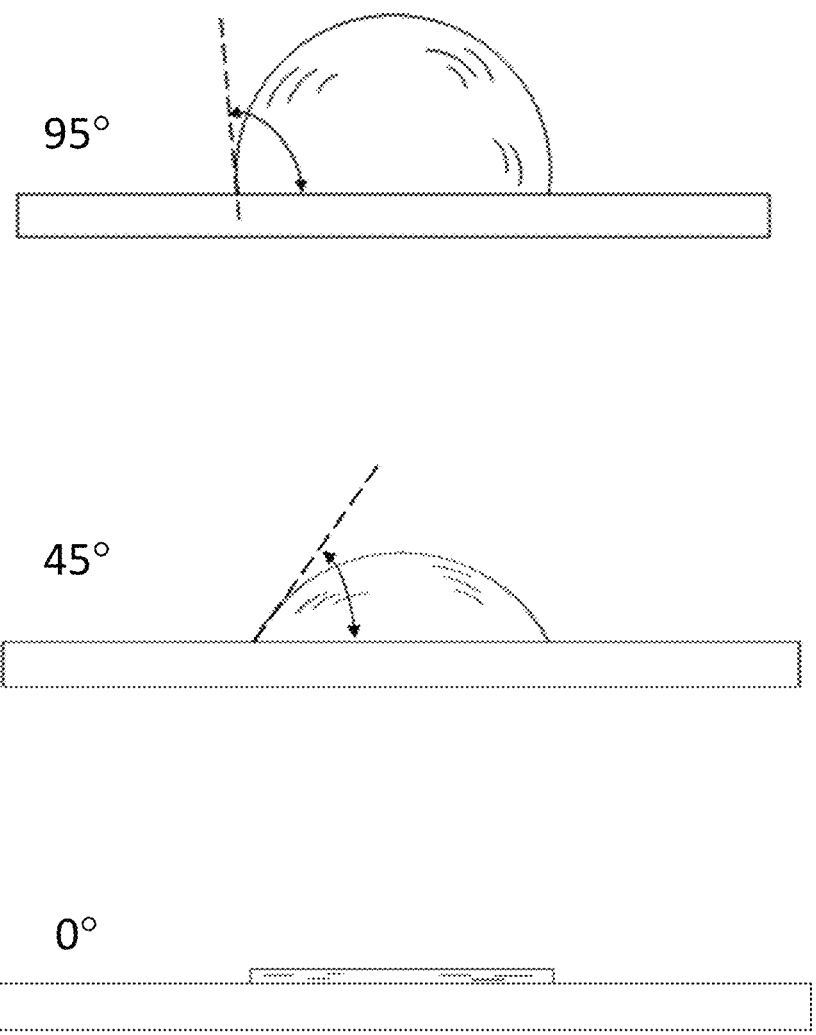
FIG. 1 illustrates the contact angle of a droplet of water on three different solid materials.

When an interface exists between a liquid and a solid, the angle between the surface of the liquid and the outline of the contact surface is described as the contact angle. The contact angle (wetting angle) is often used to quantify the wettability of a solid by a liquid, by using the Young equation. FIG. 1 illustrates the contact angle of a droplet of water on three different materials. In the case of complete wetting the liquid drop completely spreads out on the solid surface, and the contact angle is 0°. Between 0° and 90°, the solid is generally referred to as "wettable" or hydrophilic (for water) and above 90° it is generally referred to "not wettable" or hydrophobic (for water). In the case of ultrahydrophobic materials with the so-called lotus effect, the contact angle can approach the theoretical limit of 180°.

According to Young's equation, there is a relationship between the contact angle θ, the surface tension of the liquid $\sigma_l$, the interfacial tension $\sigma_{sl}$ between liquid and solid and the surface free energy $\sigma_s$ of the solid. A given system of solid, liquid, and vapor at a given temperature and pressure has a unique equilibrium contact angle. However, in practice contact angle hysteresis is observed, ranging from the so-called advancing (maximal) contact angle to the receding (minimal) contact angle. The equilibrium contact is within those values and can be calculated from them. The equilibrium contact angle reflects the relative strength of the liquid, solid, and vapor molecular interaction.

If a small enough amount of liquid is added to a drop of the liquid on a solid surface, the interfacial contact area stays the same and the contact angle increases. Similarly, if a small enough amount of liquid is removed from a drop of the liquid on the solid surface, the interfacial contact area stays the same, and the contact angle decreases. Hence, a drop placed on a surface has a spectrum of contact angles ranging from the so-called advancing (maximal) contact angle, $\theta_A$, to the so-called receding (minimal) contact angle, $\theta_R$. The contact angle hysteresis is normally defined as $\theta_A$-$\theta_R$, and the equilibrium contact angle $\theta_C$ can be calculated from these (assuming a perfectly flat surface) using the Young equation.

As mentioned above, surface roughness has a strong effect on the contact angle and wettability of a surface. The effect of roughness depends on if the droplet wets the surface grooves or cavities, or if air pockets are left between the droplet and the surface. If the surface is wetted homogeneously, the droplet is in a so-called Wenzel state. In a Wenzel state, adding surface roughness enhances the wettability caused by the chemistry of the surface. If the surface is wetted heterogeneously, the droplet is in a so-called Cassie-Baxter state.

Contact angles are extremely sensitive to contamination, and values reproducible to better than a few degrees are generally only obtained under laboratory conditions with purified liquids and very clean solid surfaces.

Various known methods can be used to measure contact angles including, for example, static sessile drop methods and dynamic sessile drop methods. Dynamic sessile drop methods are similar to static sessile drop methods but require the drop to be modified. A common type of dynamic sessile drop method involves adding volume dynamically to the drop and determining the largest contact angle possible without increasing the solid-liquid interfacial area (namely, the largest angle measured before the foot of the droplet slips out and the apparent contact angle is slightly reduced). This maximum angle is the advancing contact angle, $\theta_A$. Volume is then removed to produce the smallest possible angle, the receding angle, $\theta_A$.

Contact angles are not necessarily directly related to the force required to remove a droplet, droplet movement forces can be dependent on additional factors.

Flexible Graphite

Figure 2:
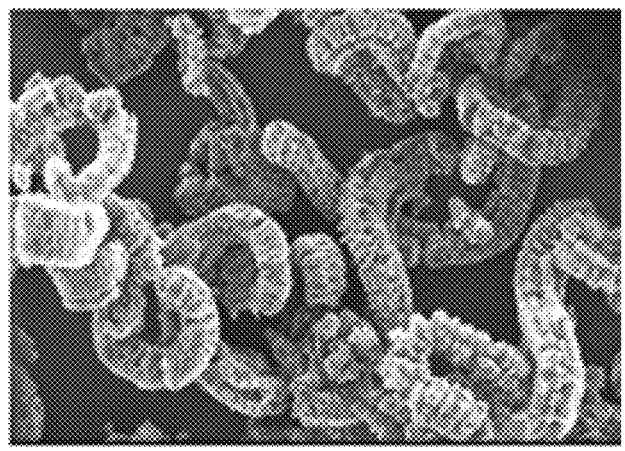
FIG. 2 is a scanning electron microscope image illustrating the structure of exfoliated graphite particles.

FIG. 2 is a scanning electron microscope image illustrating the structure of exfoliated graphite particles. Exfoliated graphite can be formed from graphite through a series of special furnaces and chemical processes. It can then be compressed to form a low-density mat, or to form sheets of flexible graphite of higher density that can be supplied on a roll. For example, a calendering process, where exfoliated graphite material is fed through a series of drums or rollers in a process that gradually brings the material to a desired thickness and density range, can be used for form flexible graphite. Calendering or compression forming steps can also be used to emboss features on one or both surfaces of the flexible graphite material that are suitable for its end-use application.

Figure 3A:
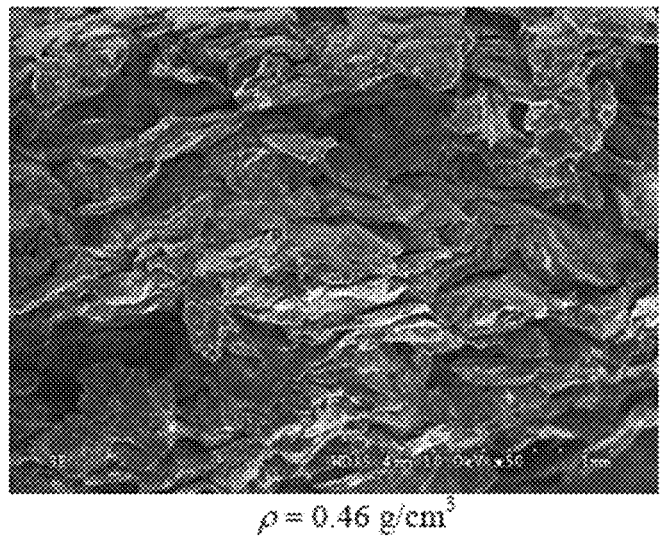
FIGS. 3A and 3B are scanning electron microscope images illustrating flexible graphite of a lower density structure and a higher density structure, respectively.
Figure 3B:
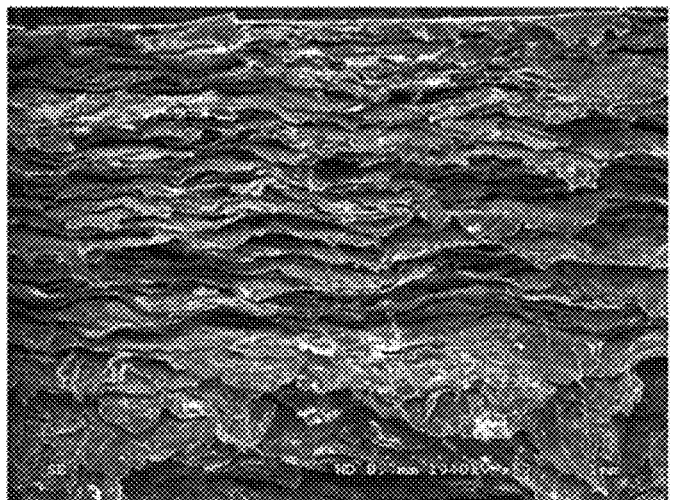

FIGS. 3A and 3B are scanning electron microscope images illustrating flexible graphite of a lower density structure and a higher density structure, respectively. The lower density structure of FIG. 3A has a density of approximately 0.46 g/cm$^3$. The higher density structure of FIG. 3B has a density of approximately 1.02 g/cm$^3$. The higher density structure of FIG. 3B is illustrative of flexible graphite typically used in fuel cell applications. Despite its higher density, the structure of the flexible graphite in this example still contains pores or air pockets.

Micro-Texturing Flexible Graphite

The particle size (for example, grain or flake size) of a material can influence the size and resolution, consistency or quality of features that can be obtained by embossing or compression molding the material.

It has been discovered that it is possible to emboss the surface of flexible graphite with an array of features where those features are much finer (namely, have much smaller dimensions and spacing) than have previously been embossed or patterned onto flexible graphite. In some embodiments, an array of features can be a regular repeating pattern comprising a plurality of features.

Thus, flexible graphite can be micro-textured with an array of features. "Micro-texturing" is used herein to refer to texturing wherein at least one dimension of the features themselves (for example, their depth or height, width, diameter) and/or the spacing between the features is less than 100 μm. In some embodiments, the lateral dimensions of the features (in the in-plane direction, for example, width or diameter), their depth or height, and the spacing between them are all less than 100 μm. In some embodiments, at least one dimension of the features themselves, or the spacing between them, is in the range between and inclusive of about 10 μm to about 100 μm. In some embodiments, the lateral dimensions of the features (for example, width or diameter), their depth or height, and the spacing between them are all in the range between and inclusive of about 10 μm to about 100 μm. In some embodiments, at least one dimension of the features themselves, or the spacing between them, is in the range between and inclusive of about 10 μm to about 50 μm. In some embodiments, a lateral dimension of the features (for example, width or diameter), their depth or height, and the spacing between them are all in the range between and inclusive of about 10 μm to about 50 μm. In some embodiments, at least one dimension of the features themselves, or the spacing between them, is in the range between and inclusive of about 10 μm to about 25 μm. In some embodiments, a lateral dimension of the features (for example, width or diameter), their depth or height, and the spacing between them are all in the range between and inclusive of about 10 μm to about 25 μm.

In some embodiments, in particular for increasing hydrophobicity, a lateral dimension of the features are less than 500 μm or less than 100 μm, their depth or height is in the range between and inclusive of about 15 μm to about 50 μm, and the spacing between them is in the range between and inclusive of about 15 μm to about 25 μm.

In some embodiments the micro-textured surface of the flexible graphite includes a plurality of projecting regularly shaped features (with corresponding cavities or depressions). In some embodiments, these are disposed in a regular geometric pattern or array.

By appropriate selection of the nature of the micro-texturing (shape, dimensions and spacing of the features, and the like) it is possible to "tune" the surface wettability characteristics of the flexible graphite as desired for a particular end-use application.

In some embodiments, micro-texturing can be used to render the surface of the flexible graphite more hydrophobic (relative to the corresponding untextured material), or in some embodiments ultraphobic.

The material can be micro-textured on one or both major surfaces, over the entire surface or selectively in specific regions. In some embodiments, the material can be micro-textured differently in different regions to impart different surface properties or characteristics in different regions thereof.

In some embodiments, the features are formed by embossing flexible graphite, for example, as described below. In some embodiments, the features are formed using photolithography and etching techniques, as described below.

Processes and Apparatus for Micro-Texturing Flexible Graphite

Micro-texturing can be achieved by embossing flexible graphite using a reusable die. In one approach silicon wafers are patterned with an inverse texture pattern, for example, using conventional wafer patterning techniques, and are used as dies to emboss and thereby micro-texture the surface of the flexible graphite. Wafer patterning techniques that can be used to pattern a silicon wafer die, include photolithography techniques (using a mask and etching and curing steps), or deep reactive ion etching (DRIE) techniques. In photolithography, various positive or negative photoresist materials can be used to pattern a silicon wafer die. For example, SU-8 is a commonly used epoxy-based negative photoresist. With a negative photoresist, the portions of the photoresists that are exposed to UV become cross-linked or cured, while the remainder of the film remains soluble and can be washed away during development.

Figure 4:
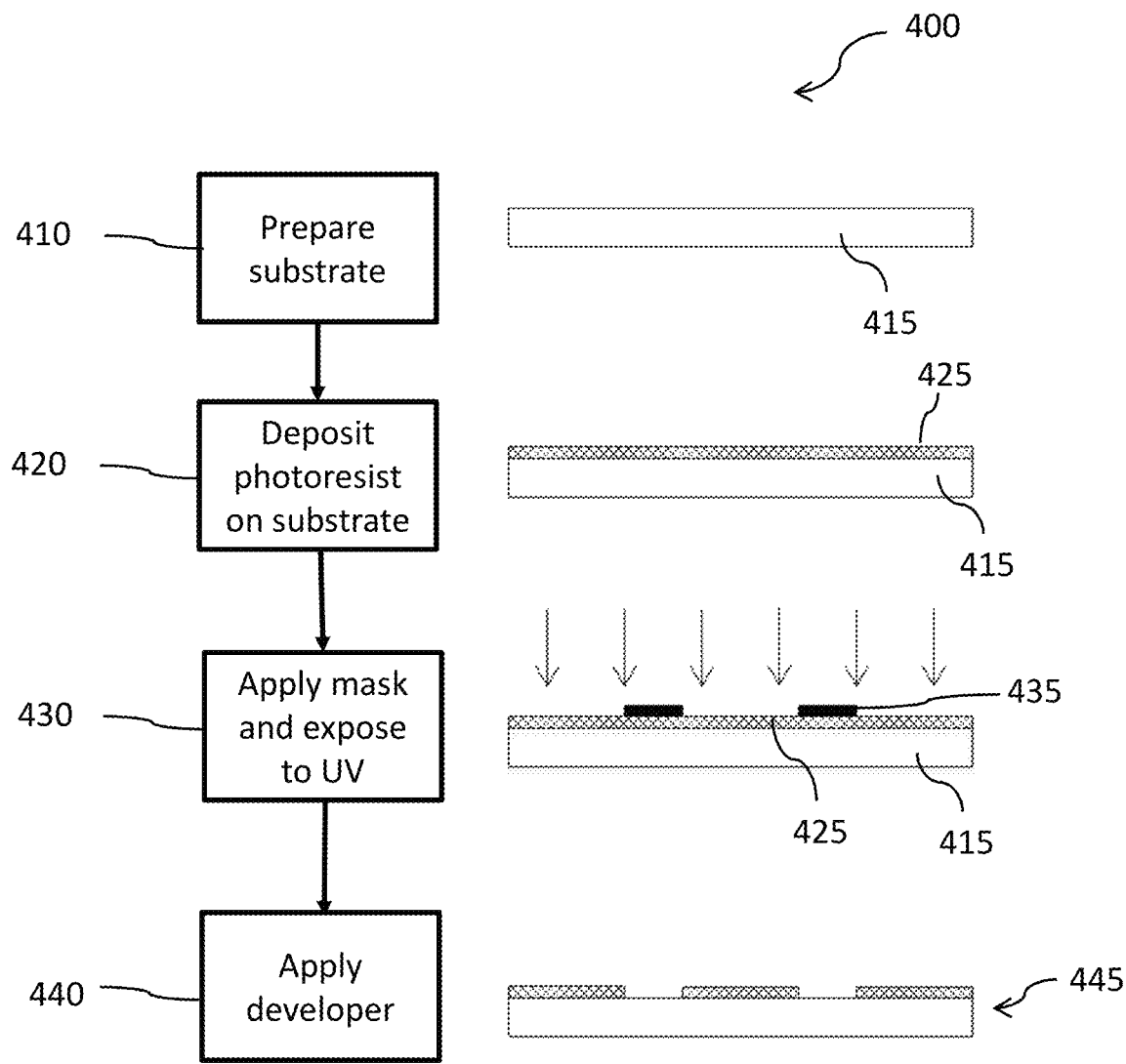
FIG. 4 illustrates a process for patterning a silicon wafer die for use in micro-texturing flexible graphite or other graphite materials.

FIG. 4 illustrates an example of process 400 for preparation of a patterned silicon wafer die. At step 410 substrate 415 is prepared. This can involve cleaning the surface of silicon substrate 415, and/or treating it to improve adhesion of a photoresist, for example. At step 420 photosensitive photoresist material 425 is deposited on substrate 415. In some embodiments, photosensitive photoresist material 425 is deposited on substrate 415 by a coating process. In some embodiments, photosensitive photoresist material 425 is deposited on substrate 415 by a lamination process. In some embodiments, spin coating is used to deposit SU-8 photoresist. In some embodiments, step 420 can involve subsequent baking or other processes to remove solvent. At step 430 patterned mask 435 is applied to the surface of the photoresist layer to block light, and the assembly is exposed to light. In some embodiments, only, or essentially only, unmasked regions of the photoresist material are exposed to light. At step 440 a solvent or developer, is then applied to the surface. In the case of a negative photoresist, the photosensitive material is strengthened (either polymerized or cross-linked) by exposure to light, and the developer dissolves away only the regions that were not exposed to light, leaving behind a coating in areas where photoresist material 425 was exposed, as illustrated in FIG. 4, to yield patterned silicon wafer 445. In cases of a positive photoresist, the photo-sensitive material is degraded by light and the developer dissolves away the regions that were exposed to light, leaving behind a coating where the mask obscured photoresist material 425, resulting in a silicon wafer patterned with inverse pattern from that illustrated in FIG. 4.

Silicon wafer dies are generally fragile and brittle and, if they are used as dies, have a tendency to break if the compression force is not sufficiently evenly applied.

In some embodiments, the silicon wafer can be laminated to a more rigid and strong backing sheet, such as a metal plate, and then used as a die to emboss flexible graphite with a micro-textured surface.

In another approach, the die itself can be made of metal, ceramic or another suitable material, that is patterned with the inverse texture pattern using a suitable technique. For some materials photolithography techniques similar to those used for producing silicon wafer dies, as described above in reference to FIG. 4, can be used. In some embodiments, a layer of photoresist can be applied to a steel or aluminum substrate, then the coated substrate can be exposed to UV light through a photomask to cure the exposed photoresist. In at least some embodiments, the uncured photoresist is then washed away, leaving a patterned metal substrate that can be used as a die for micro-texturing flexible graphite. In some embodiments, it can be beneficial to heat or otherwise treat the surface of the metal substrate prior to depositing the photoresist in order to improve adhesion of the photoresist.

In at least some embodiments involving commercial production of micro-textured flexible graphite material or components in significant volumes, durable and robust dies are desired.

Figure 5:
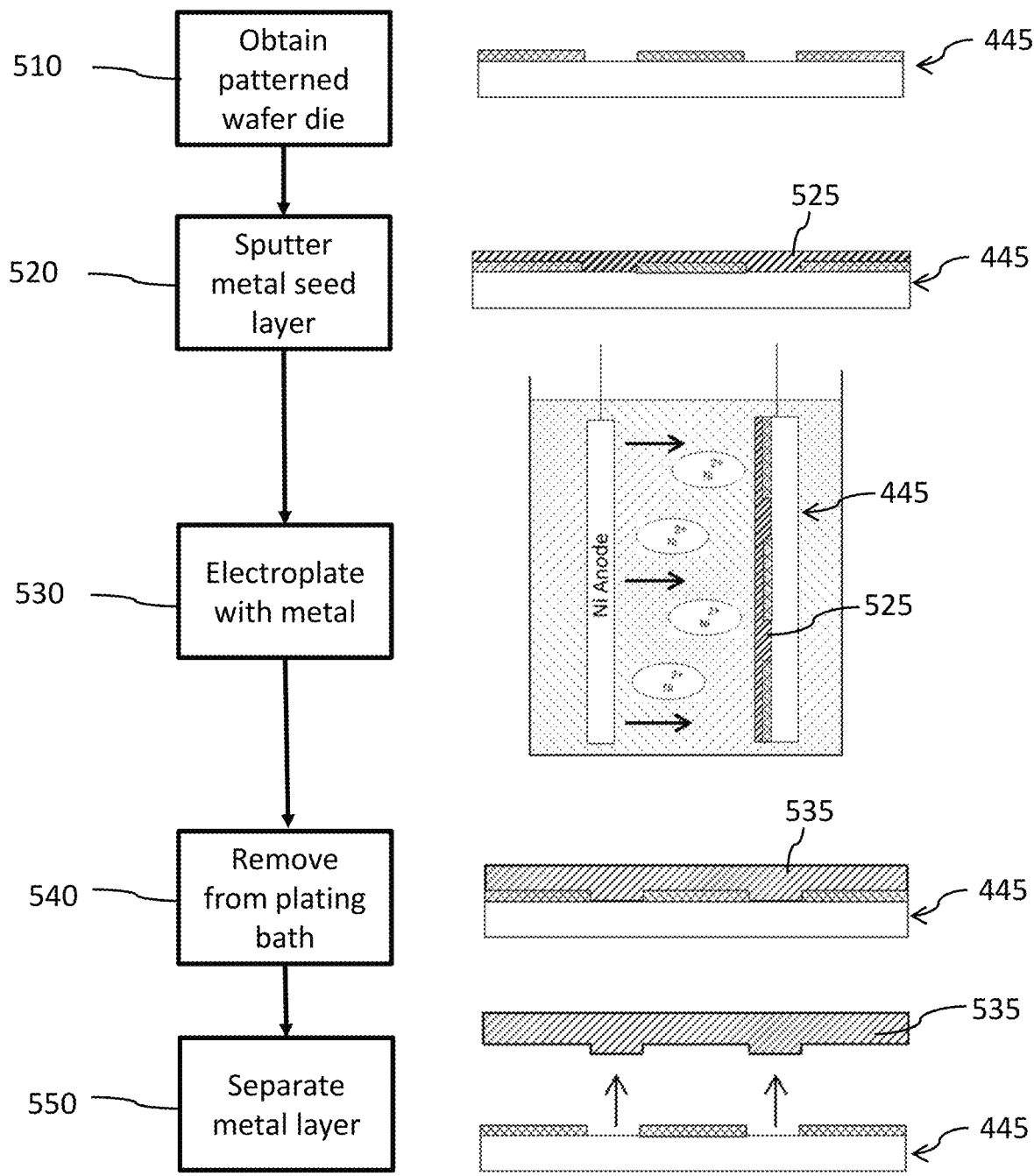
FIG. 5 illustrates a process for using a patterned silicon wafer to prepare a metal die in micro-texturing flexible graphite or other graphite materials.

In some embodiments, a patterned silicon wafer can be used to prepare a metal die. In some embodiments, a silicon wafer die can be prepared, for example, using conventional photolithography techniques as described above, then a metal can be deposited on the patterned wafer (for example, by electroplating or some other suitable technique), and then the metal layer can be separated from the patterned wafer to yield a piece of metal with a patterned surface that can be used as a die for embossing flexible graphite with a micro-textured surface. FIG. 5 illustrates an example of such a process, starting at step 510 with a patterned wafer (such as patterned wafer 445 produced using the method described in reference to FIG. 4). At step 520 seed layer 525 of a metal (such as, but not limited to nickel) is deposited on patterned wafer 445, for example, using a sputtering process. At step 530 further metal is deposited over metal seed layer 525 on patterned wafer 445, via electroplating, until a desired thickness of metal is obtained. At step 540 the wafer coated with metal layer 535 is removed from the electroplating bath. At step 550 metal layer 535 is separated from the patterned silicon wafer yielding a piece of patterned metal that can be used as a die to emboss flexible graphite with a micro-textured surface.

In some embodiments for preparing a metal die, a metal substrate can be patterned with a photoresist material as described above, and then the exposed metal (that is not coated with the cured photoresist pattern) can be selectively etched away with a suitable etchant, so that a reverse pattern is formed in the metal surface. In some embodiments, the cured photoresist material can then be removed, if desired, to yield a patterned metal that can be used as a die for micro-texturing flexible graphite.

Figure 6A:
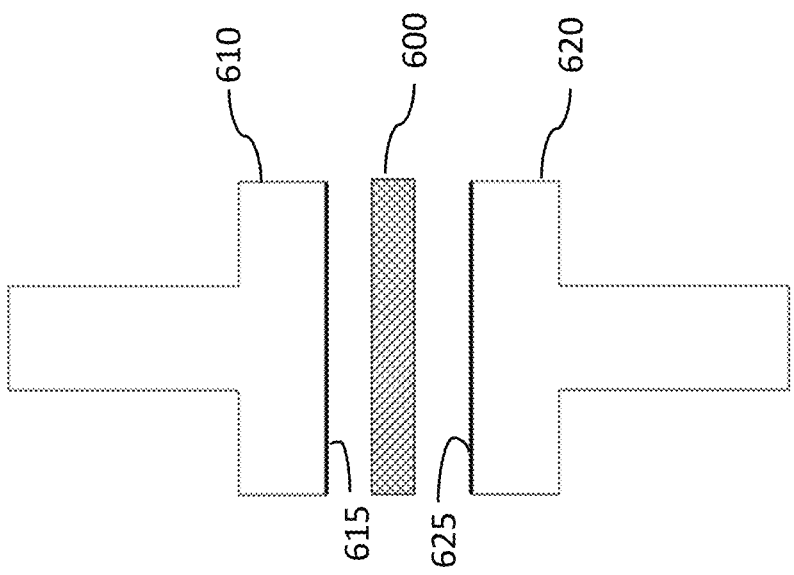
FIGS. 6A-6C illustrate a process for preparing a flexible graphite sample for micro-texturing.
Figure 6B:
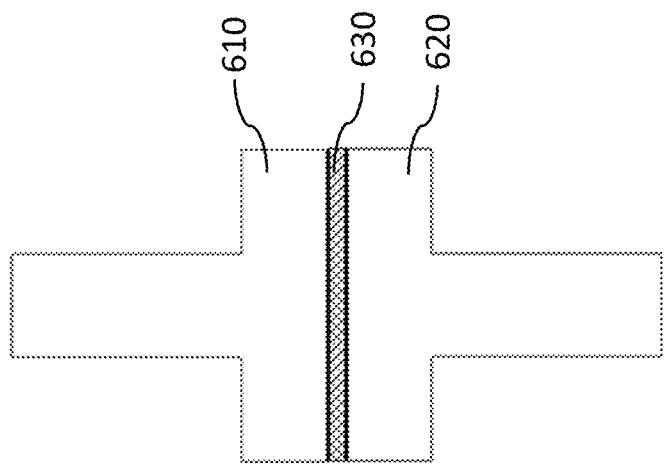
Figure 6C:

In some embodiments of a process for micro-texturing flexible graphite, a flexible graphite material is first prepared for micro-texturing. In some embodiments, the flexible graphite material can pre-compressed to increase the density of the flexible graphite, make the thickness substantially uniform, and/or to make the surface very smooth. FIGS. 6A-6C illustrate an example of such a preparation step, in which a flexible graphite material 600*a* is compressed between a pair of platens, platen 610 and platen 620 to form higher-density flexible graphite material 630. In at least some embodiments, both platen 610 and platen 620 have a polished mirror contact surface 615 and 625, respectively. In at least some embodiments, this can provide a compressed graphite material 630 with extremely smooth surfaces.

In some embodiments, the prepared flexible graphite material can be embossed using a die patterned with a reverse micro-texture. In some embodiments the prepared flexible graphite sample is placed in a die or ram base cavity or holder, optionally on an adhesive support film, and is then embossed using the die.

Figure 7A:
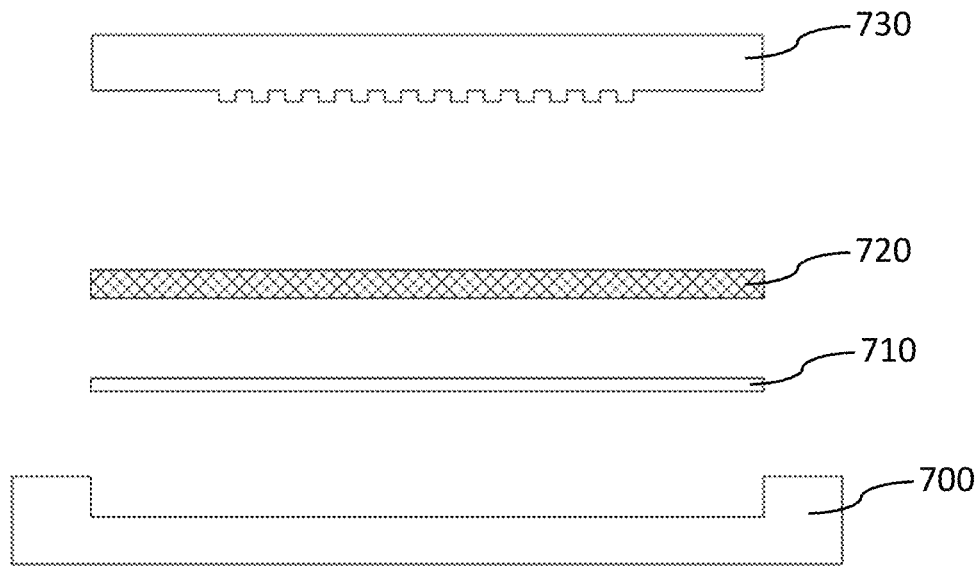
FIGS. 7A-7E illustrate a process for micro-texturing flexible graphite.
Figure 7B:
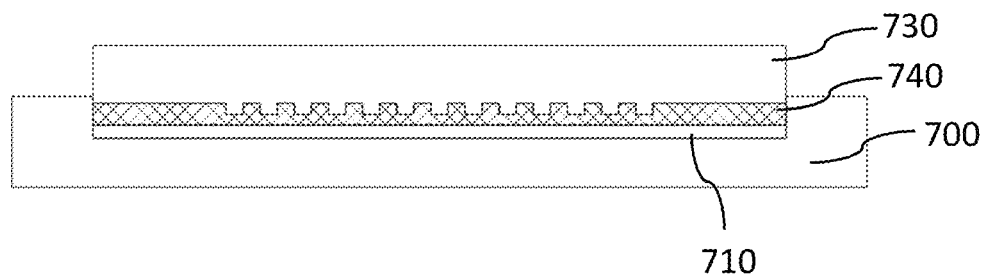
Figure 7C:
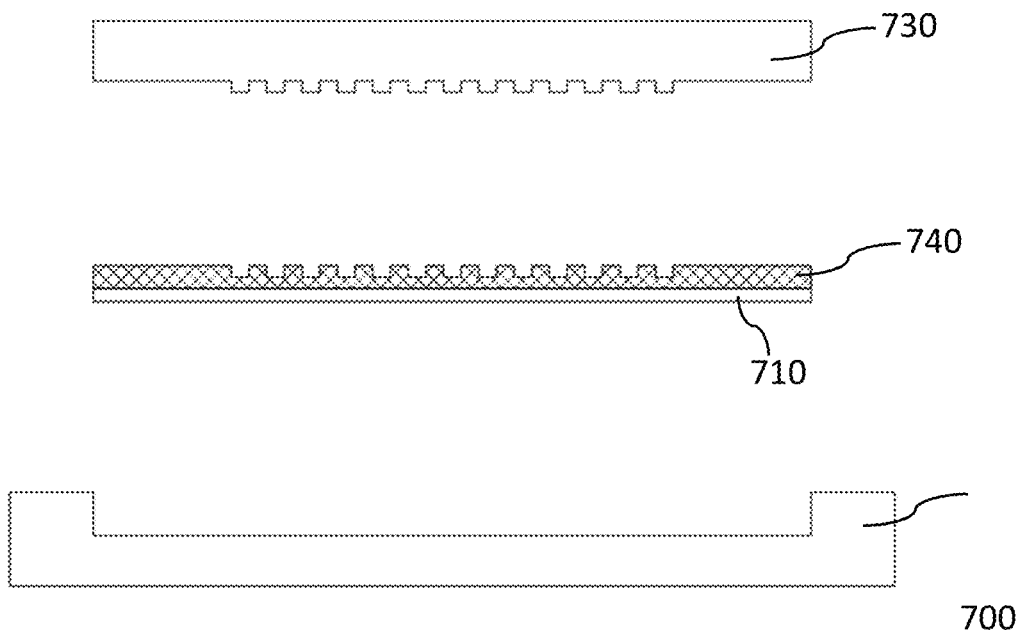
Figure 7D:
Figure 7E:
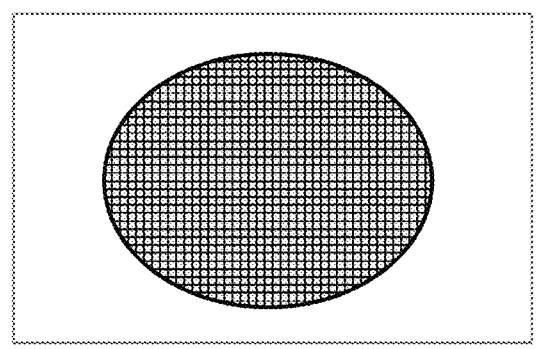

FIG. 7A-7D illustrate an example of a micro-texturing embossing process. FIG. 7A shows base cavity 700 into which optional adhesive support film 710 and piece of flexible graphite 720 are placed. Flexible graphite 720 is then compressed and embossed using die 730, as shown in FIG. 7B to form micro-textured flexible graphite material 740. In some embodiments, a vacuum can be applied during the embossing step. In at least some embodiments, die 730 is then retracted, and material 740 supported on adhesive support film 710 is removed from base cavity 700 as shown in FIG. 7C. In some embodiments, adhesive support film 710 is removed to yield micro-textured flexible graphite material 740 as represented in side view in FIG. 7D and in plan view in FIG. 7E.

In some embodiments, methods of embossing processes for micro-texturing flexible graphite, such as described above, can be implemented as a batch process. In some embodiments, discrete pieces of flexible graphite are micro-textured on one or both major surfaces, or in a continuous process, such as a roller embossing process in which rolls of flexible graphite are micro-textured on one or both major surfaces in a single or multi-stage roller embossing process. In some embodiments, this can be a reel-to-reel type process. In some embodiments, a roller embosser can be patterned with the inverse micro-texture pattern.

Figure 8A:
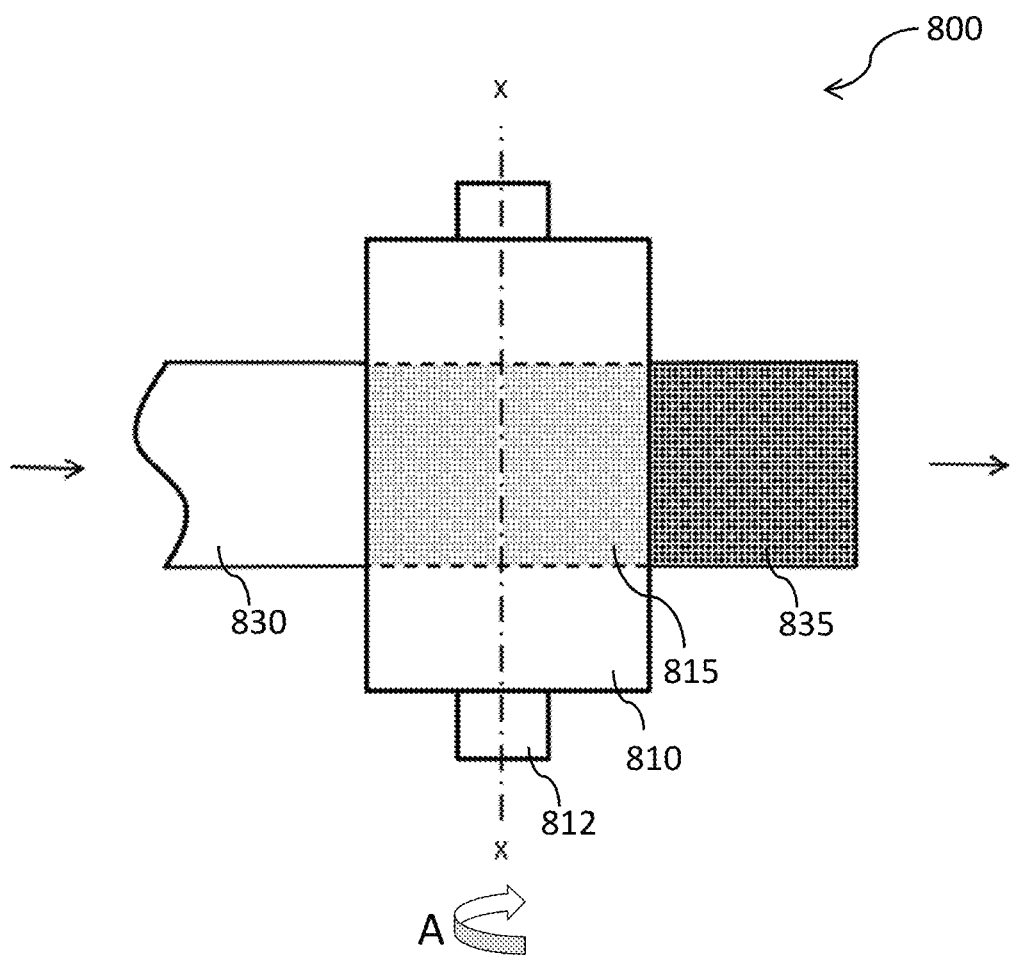
FIG. 8A is schematic plan view illustrating an example embodiment of a roller-embossing apparatus being used for micro-texturing flexible graphite.
Figure 8B:
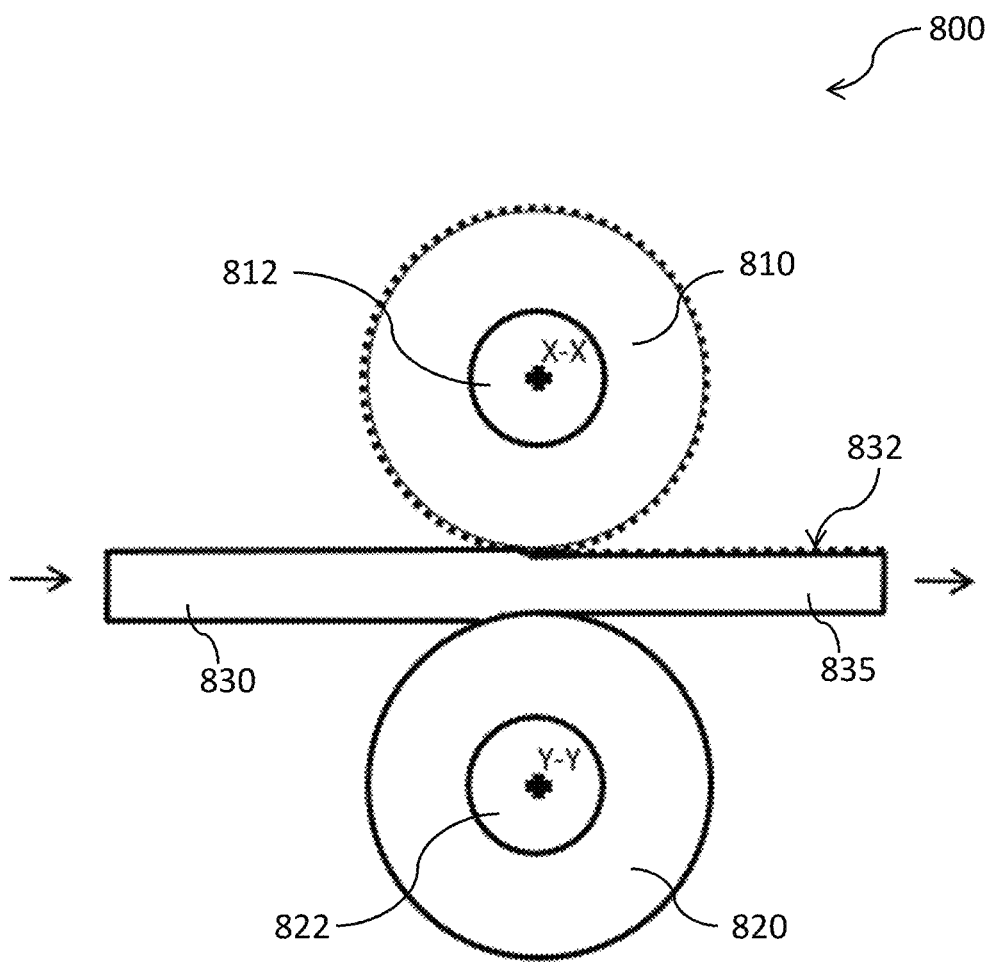
FIG. 8B is a schematic side view of the apparatus illustrated in FIG. 8A being used for micro-texturing flexible graphite.

FIGS. 8A and 8B are schematic diagrams illustrating an example embodiment of roller-embossing apparatus 800 being used for micro-texturing flexible graphite. FIG. 8A is a plan view of roller-embossing apparatus 800. FIG. 8B is a side view of roller-embossing apparatus 800. The relative dimensions of the drums, graphite sheets and micro-texturing patterns thereon are exaggerated for the purposes of illustration.

In some embodiments, apparatus 800 comprises upper drum 810 and lower drum 820. In at least some embodiments, a portion of the cylindrical surface of upper drum 810 is patterned with micro-texture pattern 815 that is the inverse of the micro-texturing to be applied to the upper surface of the process material. In some embodiments, upper drum 810 rotates on upper spindle 812 counter-clockwise about axis X-X, shown in FIGS. 8A and 8B (into the paper). In the illustrated embodiment, rotation of upper spindle 812 is indicated by arrow A in FIG. 8A. In the illustrated example, lower drum 820 has a smooth (unpatterned) surface, and rotates on lower spindle 822 clockwise about axis Y-Y, shown in FIG. 8B (into the paper).

In the illustrated embodiment, flexible graphite 830 is fed or drawn into apparatus 800 as indicated by the arrows in FIGS. 8A and 8B. In some embodiments, flexible graphite 830 passes between rotating upper drum 810 and lower drum 820 and is embossed on its upper surface to form micro-textured surface 832. Micro-textured flexible graphite material 835 leaves apparatus 800 as indicated by the arrows in FIG. 8A and FIG. 8B. In some embodiments, both rollers can be patterned with a micro-textured pattern so that the process material can be textured on both surfaces. In some embodiments, most, if not all of the surface(s) of the process material can be micro-textured with one or more different types of patterns and/or features, or just portions of the surface(s) can be micro-textured with one or more different types of patterns and/or features.

In some embodiments, a roller-embossing micro-texturing process is a multi-stage process. In some embodiments, flexible graphite can be calendered between a pair of smooth rollers first, to prepare it for subsequent micro-texturing by roller embossing. In some embodiments, flexible graphite can be micro-textured on one surface and then the other, for example by passing it through two pairs of rollers. In some embodiments, micro-texturing can be accomplished by applying the micro-texturing pattern in multiple steps by embossing one or both surfaces using different patterned rollers in sequence.

Experimental Examples

Several silicon wafer dies were fabricated, using SU-8 photoresist and a process similar to that described in reference to FIG. 4. Each circular silicon wafer die was patterned with seven different 2.5 cm×2.5 cm arrays of microfeatures. The shape, dimensions and spacing of the microfeatures in each array are described in Table 1. Each feature was replicated in a regular pattern so that the array was 2.5 cm×2.5 cm.

TABLE 1

| Array (#) | Feature height (μm) | Feature shape | Feature dimensions (μm) | Border Width or Spacing (μm) |
|---|---|---|---|---|
| 1-A | 4.5 | Square-based pyramid | 20 × 20 | 5 |
| 1-B | 17 | | | |
| 2-A | 4.5 | square | 10 × 10 | 10 |
| 2-B | 17 | | | |
| 3-A | 4.5 | square | 50 × 50 | 10 |
| 3-B | 17 | | | |
| 4-A | 4.5 | square | 500 × 500 | 10 |
| 4-B | 17 | | | |
| 5-A | 4.5 | square | 50 × 50 | 25 |
| 5-B | 17 | | | |
| 6-A | 4.5 | square | 500 × 500 | 25 |
| 6-B | 17 | | | |
| 7-A | 4.5 | square | 500 × 500 | 50 |
| 7-B | 17 | | | |
| 8-A | 4.5 | square | 500 × 500 | 100 |
| 8-B | 17 | | | |
| 9-A | 4.5 | circle | 10 (diameter) | 10 |
| 9-B | 17 | | | |
| 10-A | 4.5 | circle | 50 (diameter) | 10 |
| 10-B | 17 | | | |
| 11-A | 4.5 | circle | 500 (radius) | 10 |
| 11-B | 17 | | | |
| 12-A | 4.5 | circle | 100 (diameter) | 20 |
| 12-B | 17 | | | |
| 13-A | 4.5 | straight rib | 10 (width) | 10 |
| 13-B | 17 | | | |
| 14-A | 4.5 | straight rib | 50 (width) | 50 |
| 14-B | 17 | | | |
| 15-A | 4.5 | straight rib | 250 (width) | 50 |
| 15-B | 17 | | | |
| 16-A | 4.5 | hexagon | 10 (corner-to-corner diameter) | 10 |
| 16-B | 17 | | | |
| 17-A | 4.5 | hexagon | 50 (corner-to-corner diameter) | 10 |
| 17-B | 17 | | | |
| 18-A | 4.5 | hexagon | 500 (corner-to-corner diameter) | 10 |
| 18-B | 17 | | | |
| 19-A | 4.5 | hexagon | 50 (corner-to-corner diameter) | 25 |
| 19-B | 17 | | | |
| 20-A | 4.5 | hexagon | 500 (corner-to-corner diameter) | 25 |
| 20-B | 17 | | | |
| 21-A | 4.5 | hexagon | 500 (corner-to-corner diameter) | 50 |
| 21-B | 17 | | | |

The patterns were transferred from the wafer dies to flexible graphite (commercially available flexible graphite sheet material TG797, 70 mg/cm$^2$, thickness 3 mm) using an embossing process in a wafer bonding apparatus. The flexible graphite was first pre-compressed to a thickness of 1 mm, with a smooth mirror surface platen on both sides to promote a consistent material thickness and a smooth surface for the embossing step. The embossing process incorporated highly accurate positioning of the wafer dies. The compression forces that were applied to the flexible graphite during the embossing step were carefully controlled to try to allow embossing of the micro-texturing features, preferably without damaging either the flexible graphite or the fragile silicon wafer dies. The compression forces that were used were in the range between and inclusive of 15-25 kN. The process also used careful alignment of the RAM or vertical stroke of the equipment so as to try not to disturb the patterns during embossing.

Several dies were damaged during the embossing process as a result of uneven alignment with the press, or improper placement of the dies in the tool. Another challenge was to compress the flexible graphite evenly and flat (perpendicular to the plane of the material) so that the overall reduction in the bulk thickness of the material caused by the embossing process was substantially constant across the area of the flexible graphite sample. In some cases, the degree of slope or unevenness of the compression across the sample during embossing process was larger than the height of the micro-texturing features themselves, and the micro-texturing pattern did not emboss properly. However, despite these difficulties, several successful micro-textured flexible graphite samples were successfully prepared and tested.

The resulting micro-textured surfaces were evaluated with a profilometer and, in some cases contact angle measurements were taken using a contact angle goniometer with deionized (DI) water droplets.

Figure 9A:
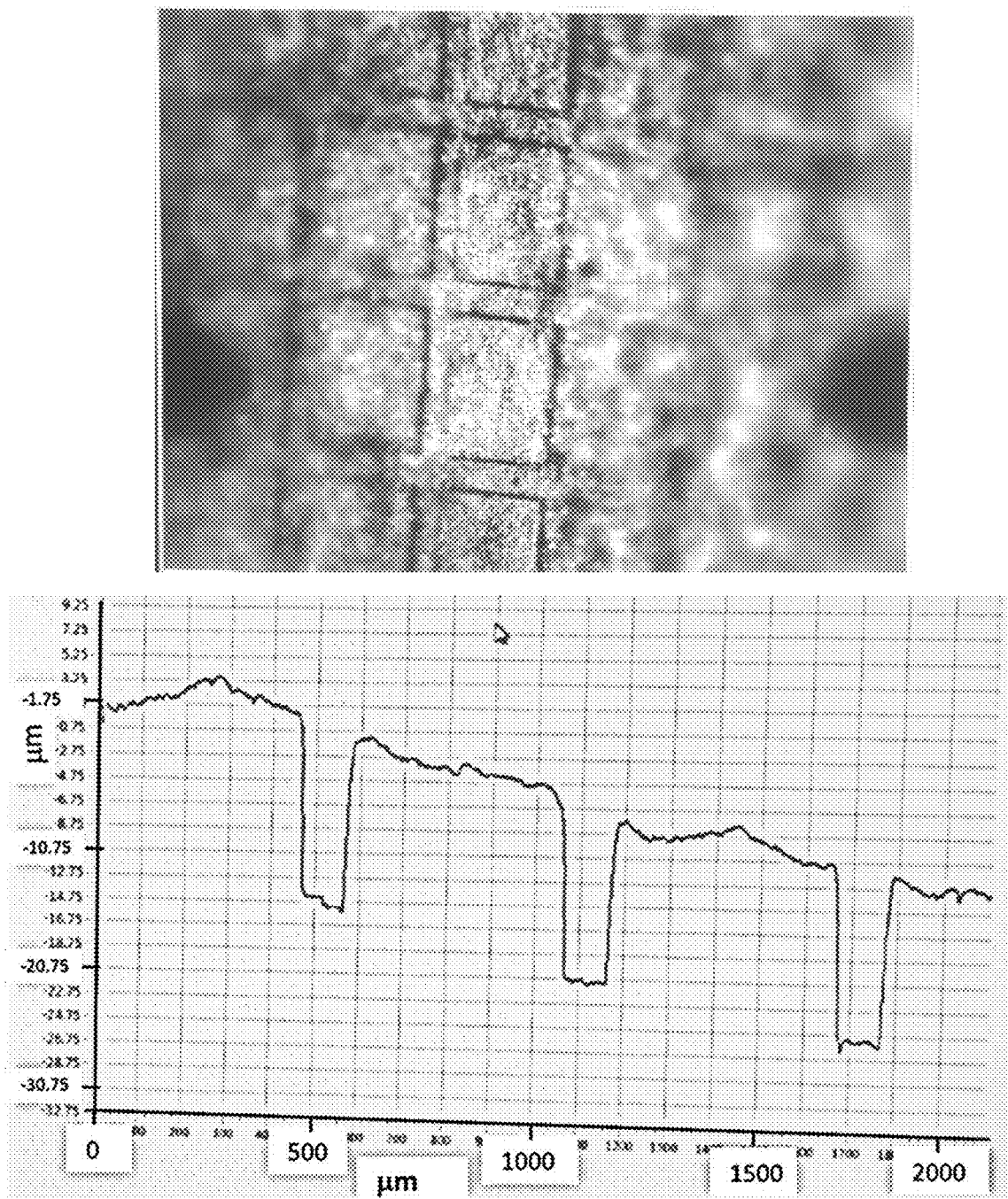
FIGS. 9A-9E show microscope images and profilometry for five flexible graphite samples, each micro-textured with a different pattern.

The profilometer was used to evaluate the quality and consistency of the embossed micro-features, and the feature size. For example, FIG. 9A shows a microscope image and profile measurement (obtained using a laser profilometer) of surface micro-texturing produced using die array #8-B, where the flexible graphite is micro-textured with an array of 500×500 μm square protrusions with 100 μm spacing between these features (17 μm height).

Figure 9B:
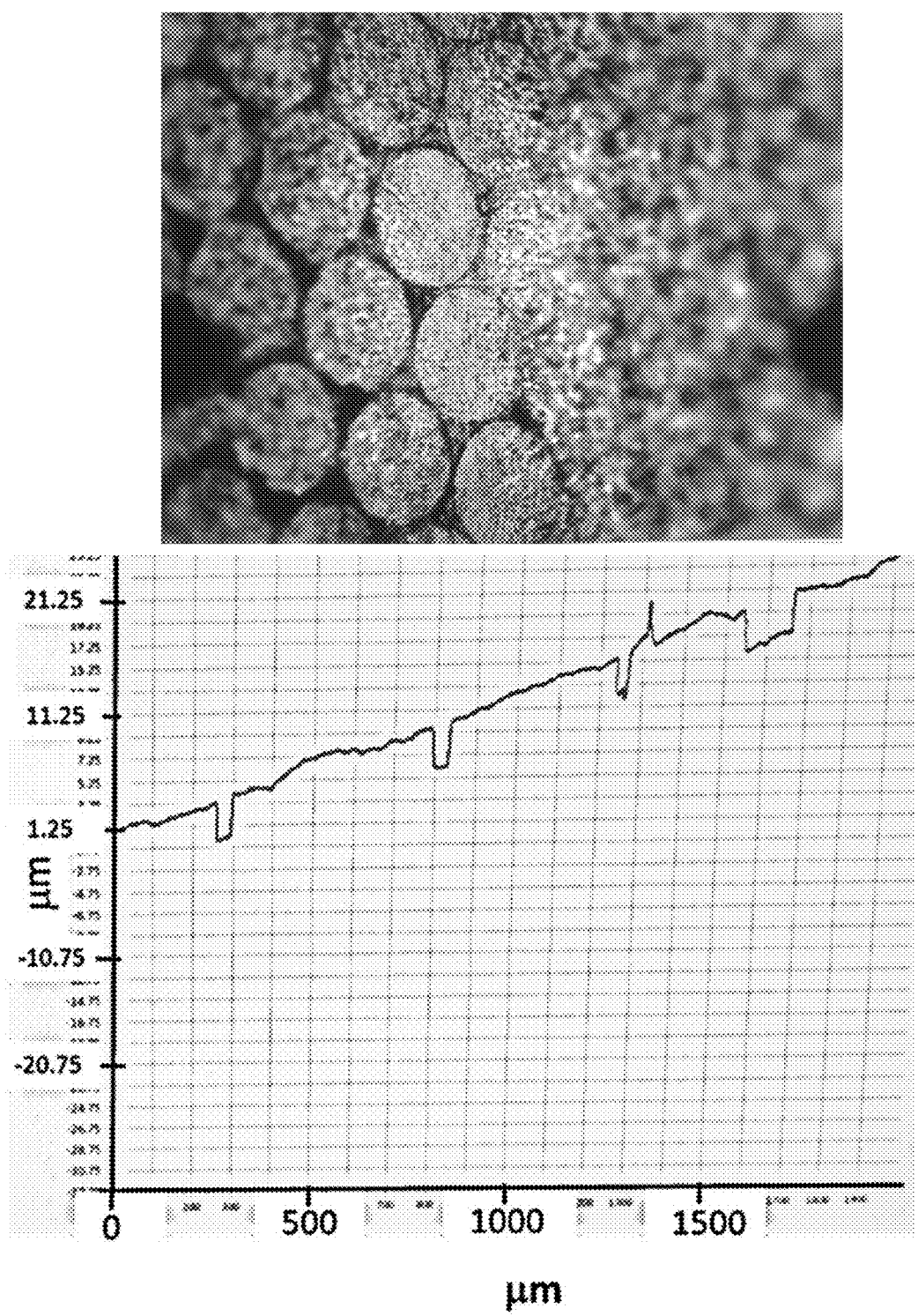

FIG. 9B shows a microscope image and profile measurement of surface micro-texturing produced using die array #11-A, where the flexible graphite is micro-textured with an array of 500 μm diameter circular (cylindrical) protrusions with 10 μm spacing between these features (4.5 μm height).

Figure 9C:
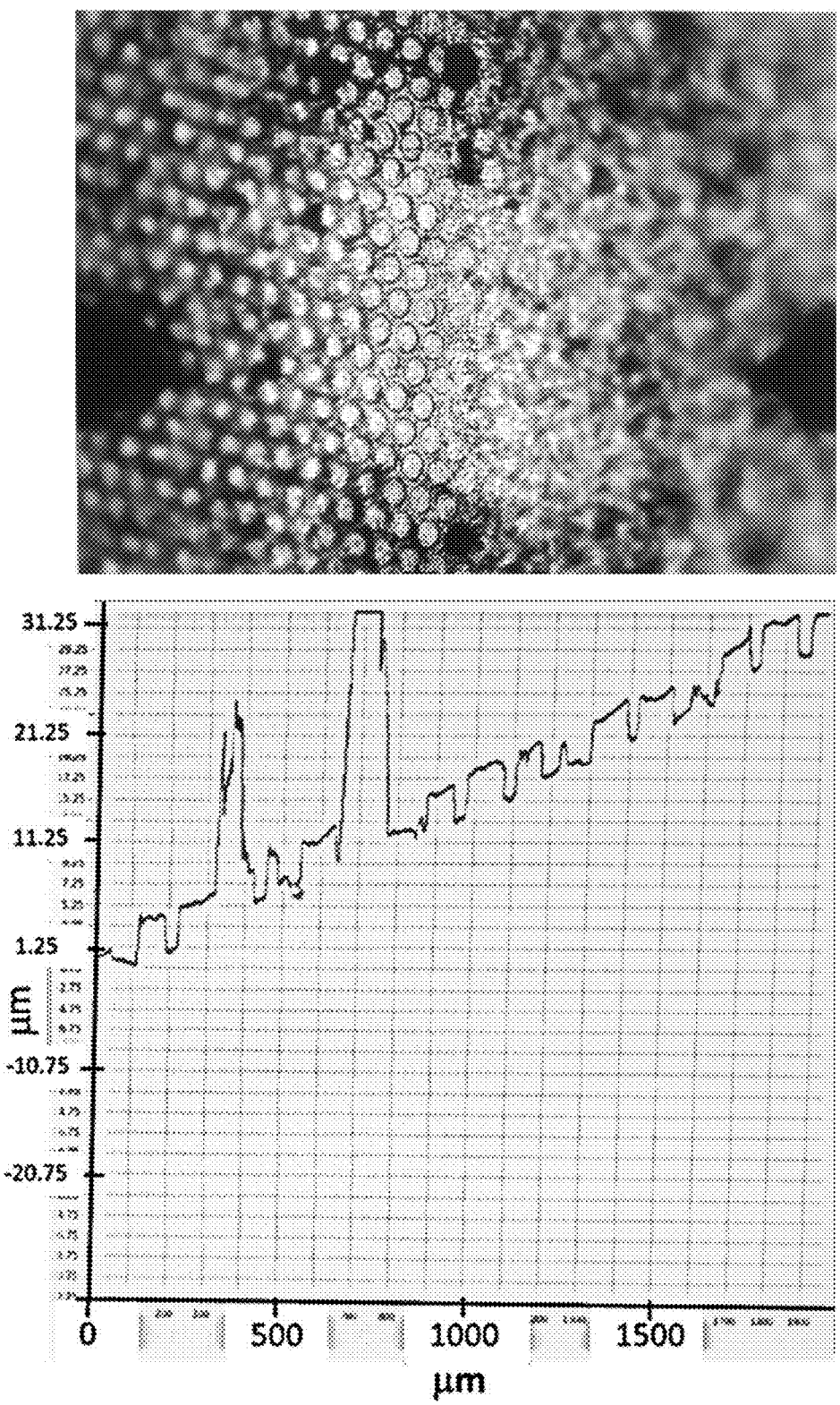

FIG. 9C shows a microscope image and profile measurement of surface micro-texturing produced using die array #12-A, where the flexible graphite is micro-textured with an array of 100 μm diameter circular (cylindrical) protrusions with 20 μm spacing between these features (4.5 μm height).

Figure 9D:
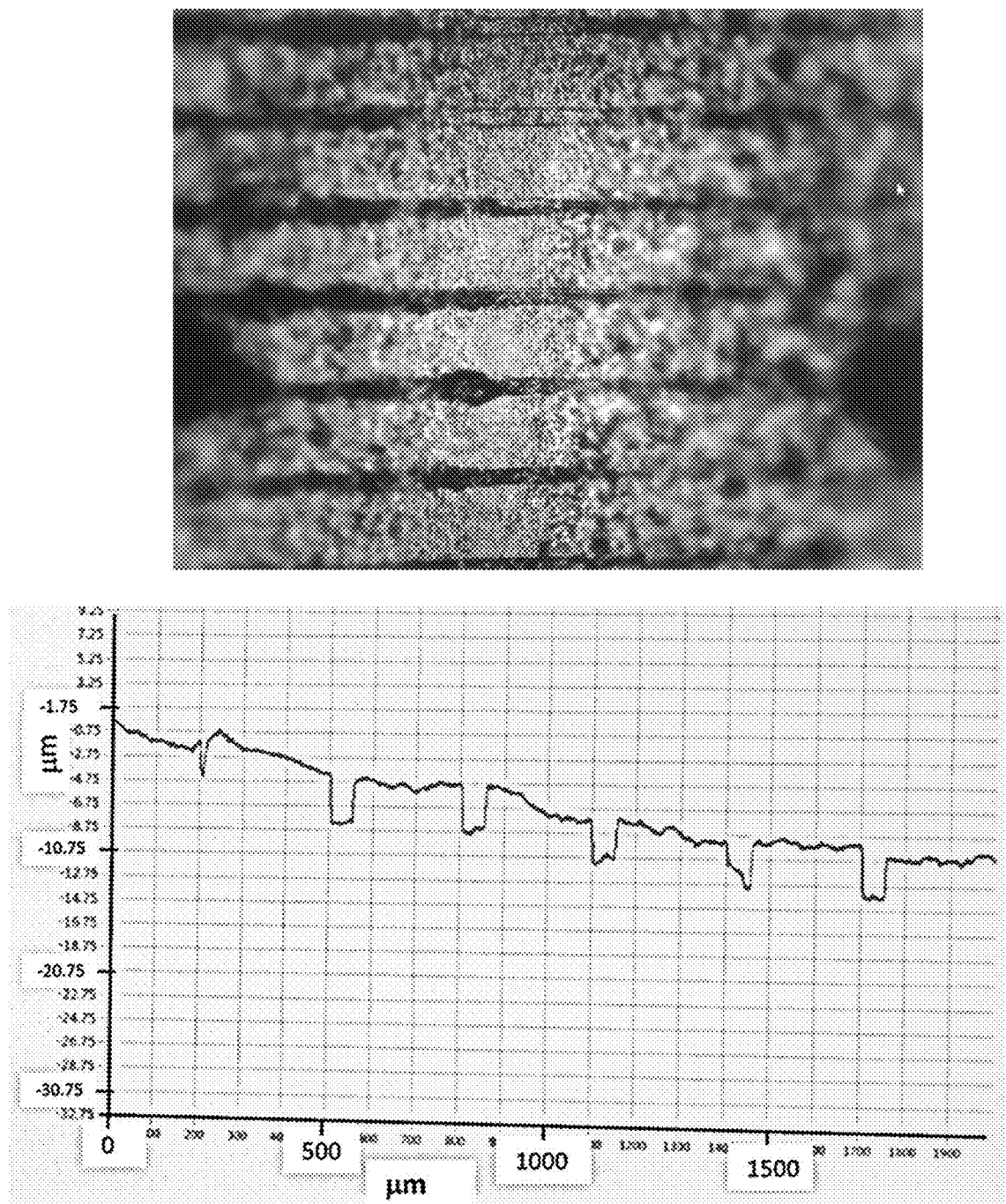

FIG. 9D shows a microscope image and profile measurement of surface micro-texturing produced using die array #15-A, where the flexible graphite is micro-textured with series of parallel protruding ribs with width 250 μm and 50 μm spacing between ribs (4.5 μm height).

Figure 9E:
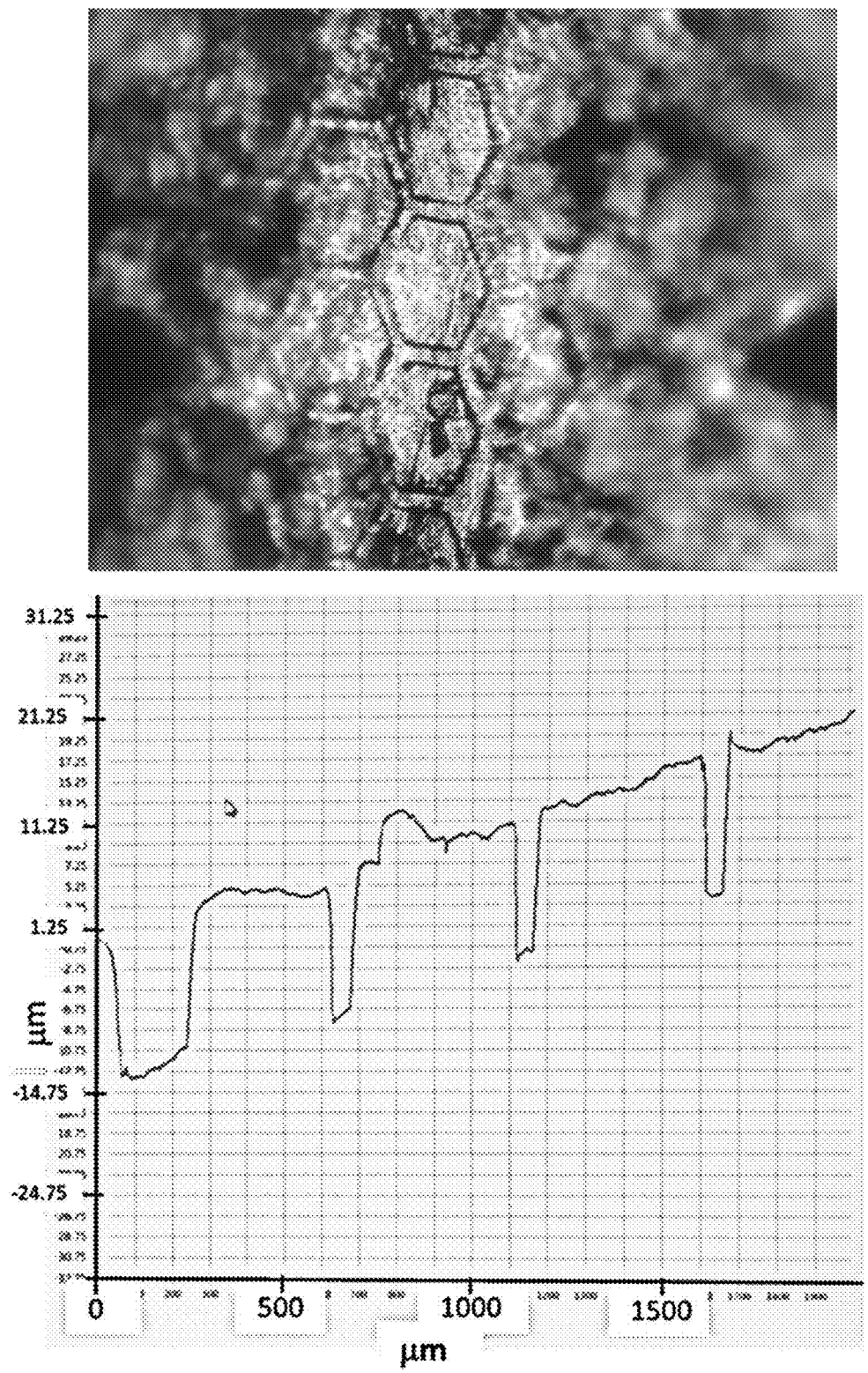

FIG. 9E shows a microscope image and profile measurement of surface micro-texturing produced using die array #21-B, where the flexible graphite is micro-textured with an array of 500 μm wide hexagonal protrusions with 50 μm spacing between these features (17 μm height).

Figure 10A:
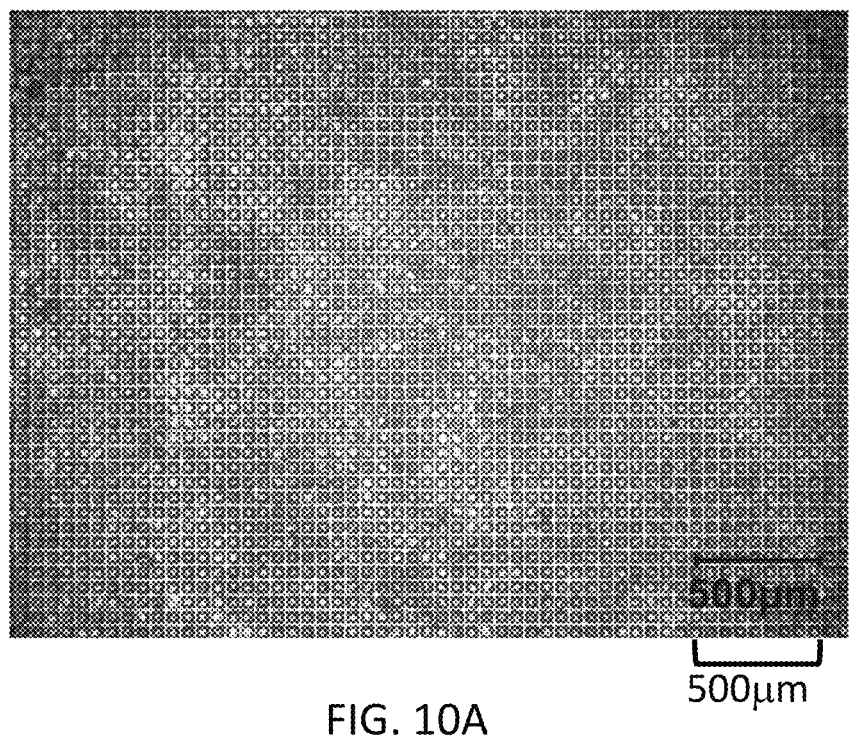
FIGS. 10A and 10B are high resolution digital microscopes images, at two different magnifications, of a flexible graphite surface micro-textured with an array of square protrusions.
Figure 10B:
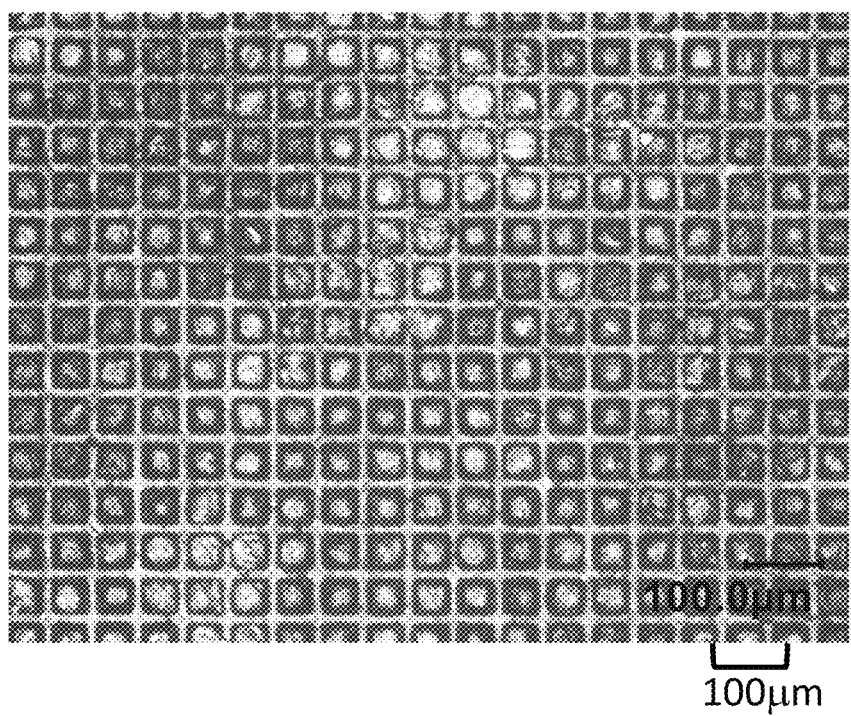

FIGS. 10A and 10B are high resolution digital microscope images, at 100× and 300× magnifications, respectively, of surface micro-texturing of a flexible graphite surface produced using die array #3-B, where flexible graphite is micro-textured with an array of 50×50 μm square protrusions (or pillars) with 10 μm spacing between these features (~17 μm height).

Figure 11A:
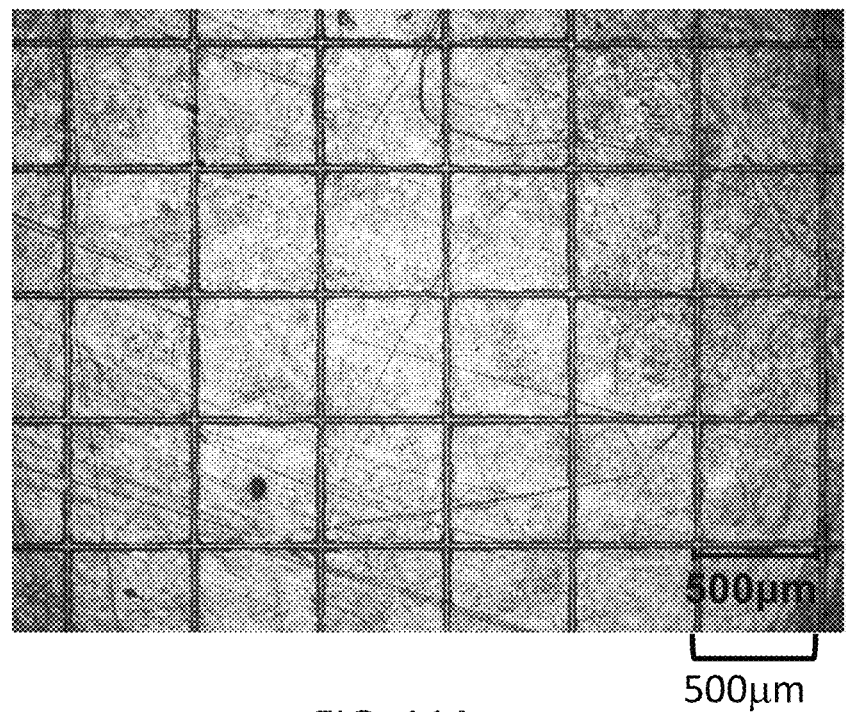
FIGS. 11A and 11B are high resolution digital microscope images, at two different magnifications, of a flexible graphite surface micro-textured with an array of square protrusions.
Figure 11B:
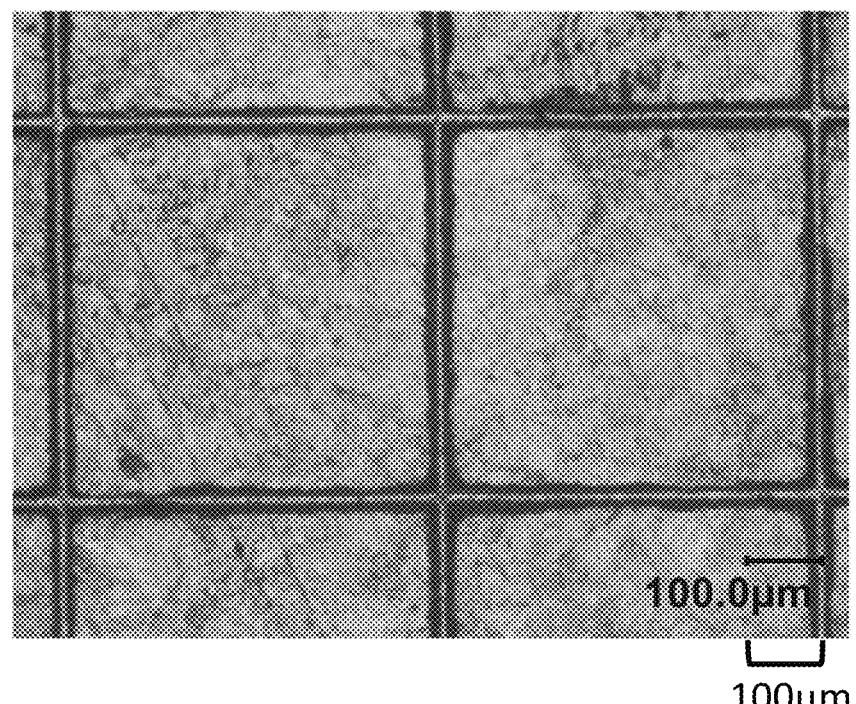

FIGS. 11A and 11B are high resolution digital microscope images, at 100× and 300× magnifications, respectively, of surface micro-texturing of a flexible graphite surface produced using die array #4-B, where flexible graphite is micro-textured with an array of 500×500 μm square protrusions with 10 μm spacing between these features (~17 μm height).

Figure 12A:
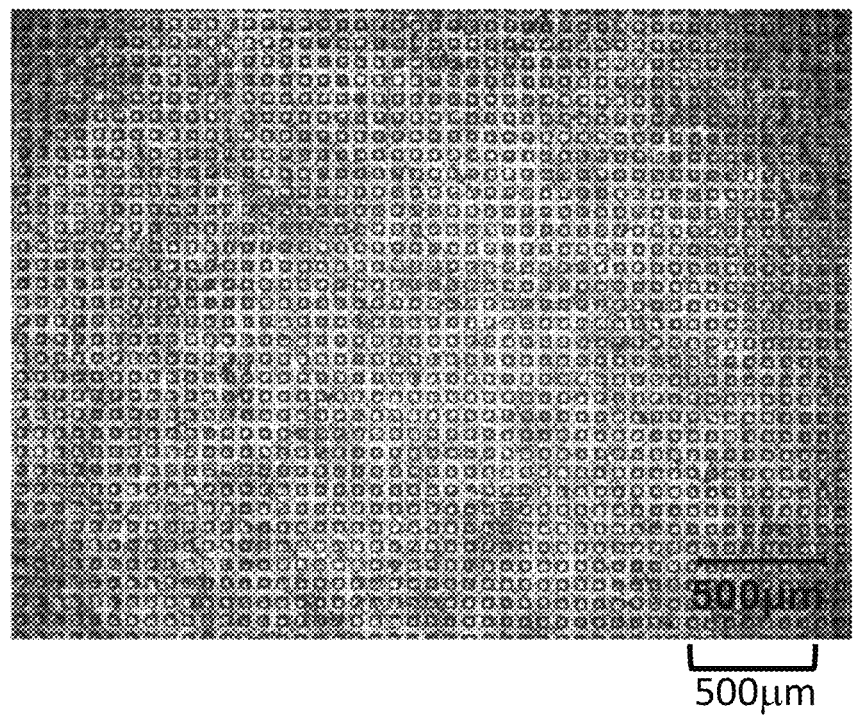
FIGS. 12A and 12B are high resolution digital microscope images, at two different magnifications, of a flexible graphite surface micro-textured with an array of square protrusions.
Figure 12B:
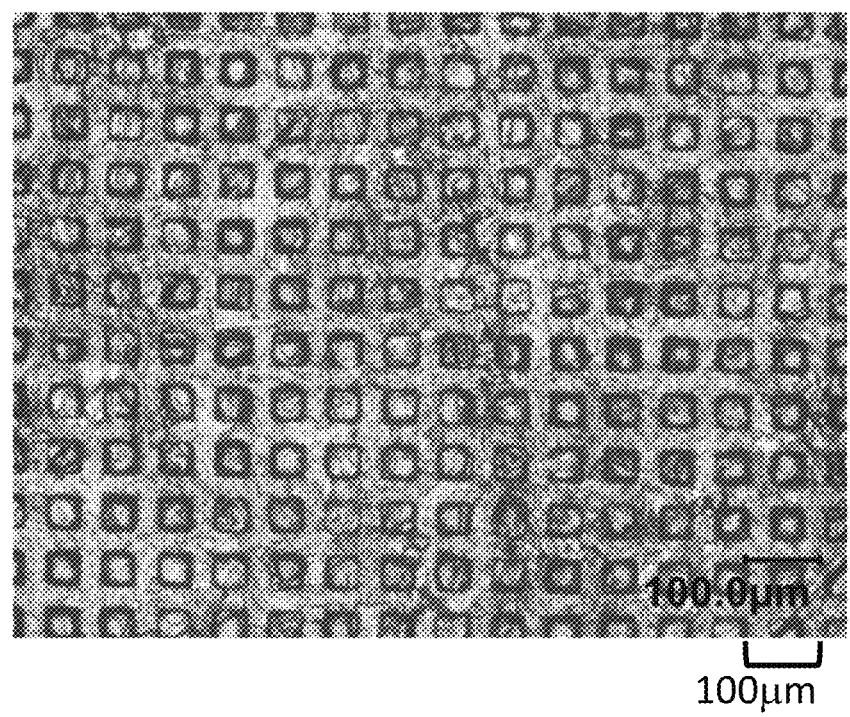

FIGS. 12A and 12B are high resolution digital microscope images, at 100× and 300× magnifications, respectively, of surface micro-texturing of a flexible graphite surface produced using die array #5-B, where flexible graphite is micro-textured with an array of 50×50 μm square protrusions with 25 μm spacing between these features (~17 μm height).

Figure 13A:
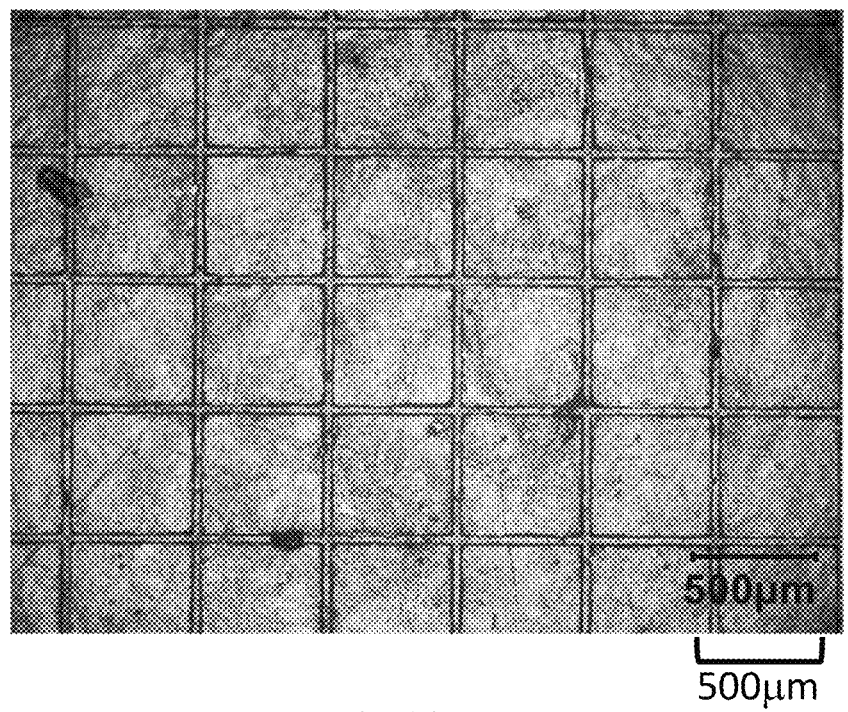
FIGS. 13A and 13B are high resolution digital microscope images, at two different magnifications, of a flexible graphite surface micro-textured with an array of square protrusions.
Figure 13B:
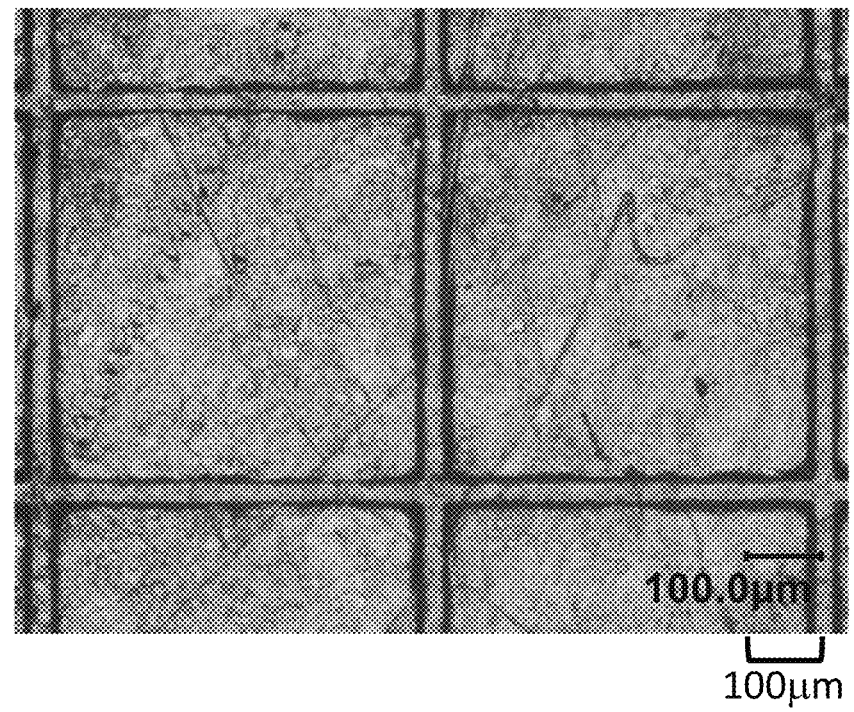

FIGS. 13A and 13B are high resolution digital microscope images, at 100× and 300× magnifications, respectively, of surface micro-texturing of a flexible graphite surface produced using die array #6-B, where flexible graphite is micro-textured with an array of 500×500 μm square protrusions with 25 μm spacing between these features (~17 μm height).

Figure 14A:
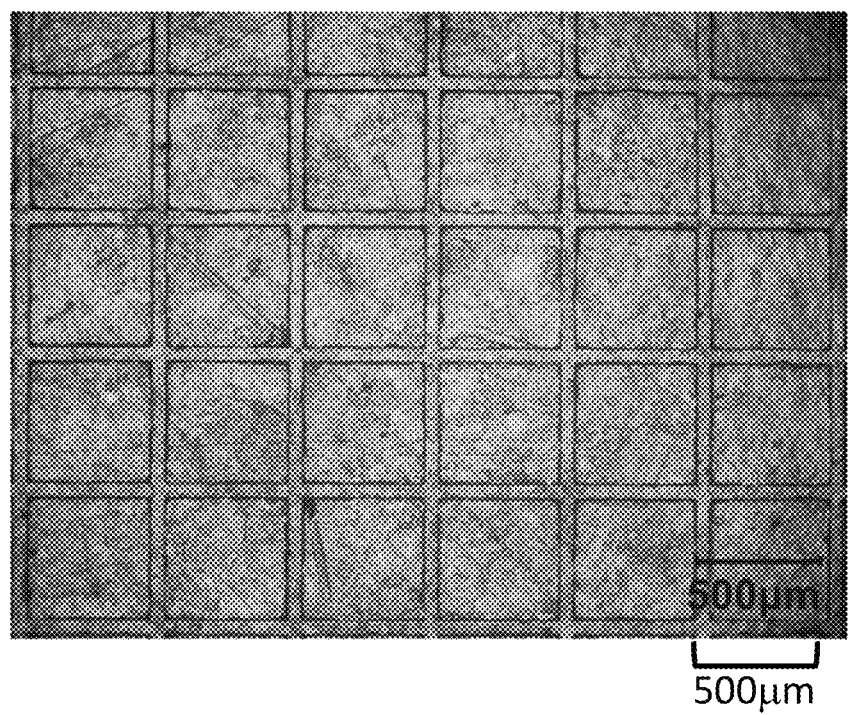
FIGS. 14A and 14B are high resolution digital microscope images, at two different magnifications, of a flexible graphite surface micro-textured with an array of square protrusions.
Figure 14B:
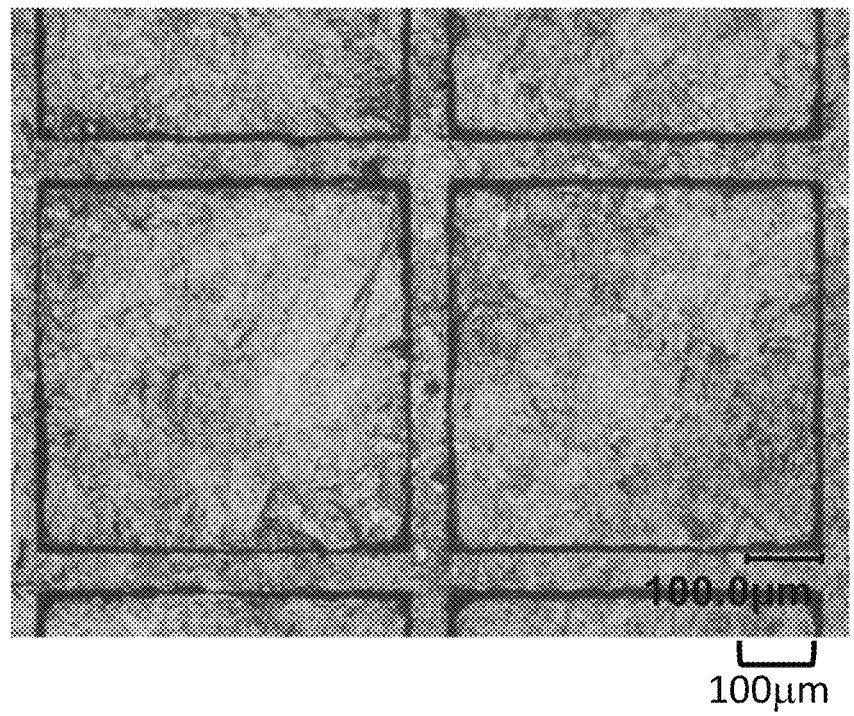

FIGS. 14A and 14B are high resolution digital microscope images, at 100× and 300× magnifications, respectively, of surface micro-texturing of a flexible graphite surface produced using die array #7-B, where flexible graphite is micro-textured with an array of 500×500 μm square protrusions with 50 μm spacing between these features (~17 μm height).

Figure 15A:
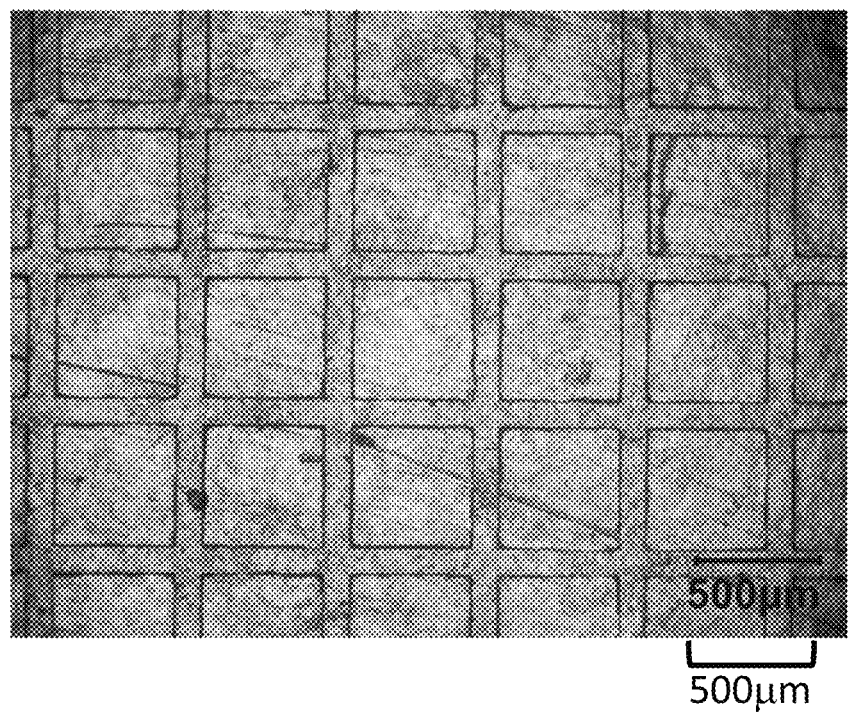
FIGS. 15A and 15B are high resolution digital microscope images, at two different magnifications, of a flexible graphite surface micro-textured with an array of square protrusions.
Figure 15B:
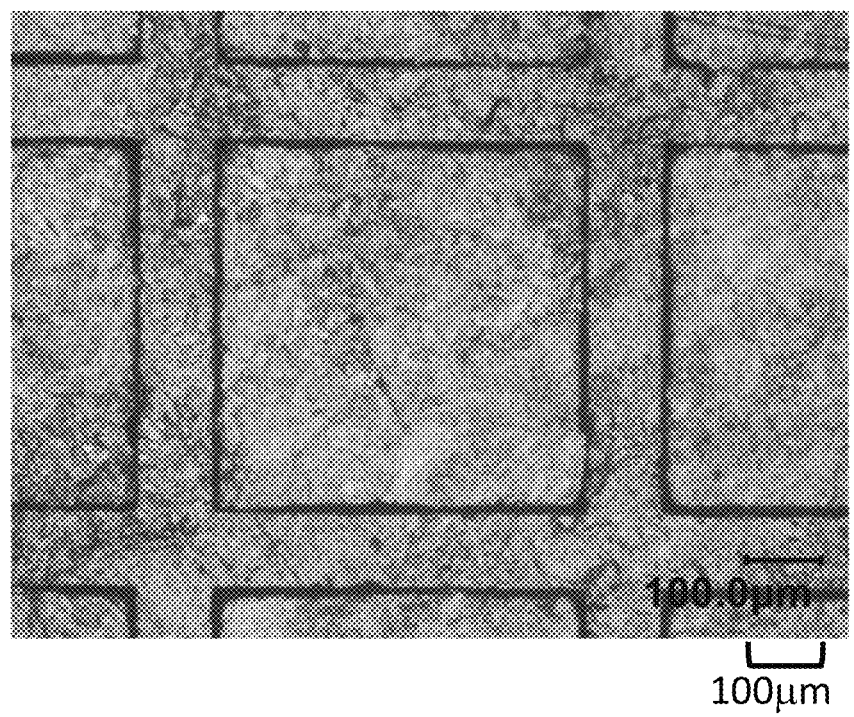

FIGS. 15A and 15B are high resolution digital microscope images, at 100× and 300× magnifications, respectively, of surface micro-texturing of a flexible graphite surface produced using die array #8-B, where flexible graphite is micro-textured with an array of 500×500 μm square protrusions with 100 μm spacing between these features (~17 μm height).

Figure 16A:
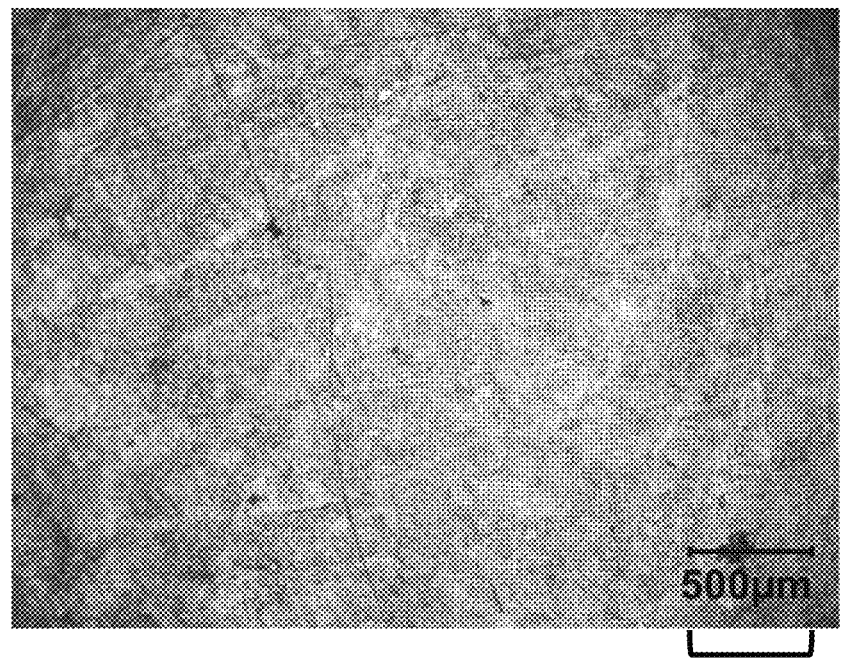
FIGS. 16A and 16B are high resolution digital microscope images, at two different magnifications, of a flexible graphite surface micro-textured with an array of cylindrical protrusions.
Figure 16B:
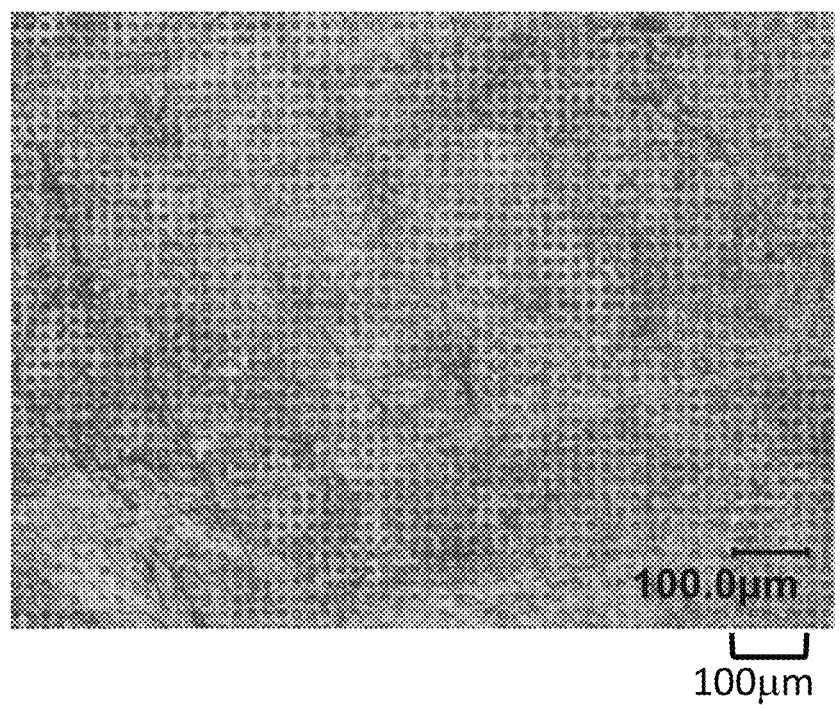

FIGS. 16A and 16B are high resolution digital microscope images, at 100× and 300× magnifications, respectively, of surface micro-texturing of a flexible graphite surface produced using die array #9-B, where flexible graphite is micro-textured with an array of 10 μm diameter round (cylindrical) protrusions with 10 μm spacing between these features (~17 μm height).

The high resolution digital microscope images shown in FIGS. 10A to 16B above were obtained using a Keyence high resolution digital microscope.

Water Contact Angle Measurements

Contact angle goniometers are commercially available. For the present tests a Dataphysics Model OCA 15 was used to measure contact angle.

Figure 17:
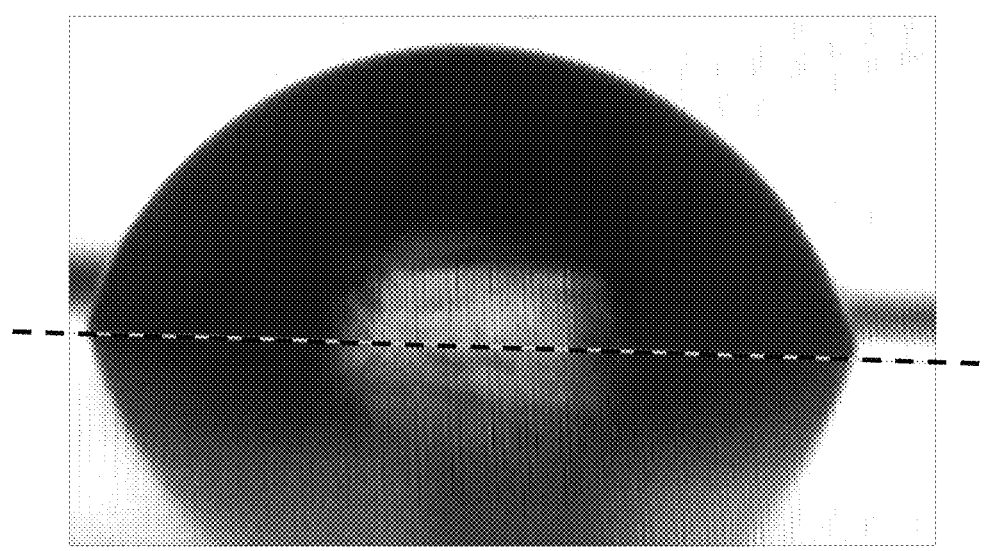
FIG. 17 is a photograph showing a water droplet on a smooth (untextured) portion of a flexible graphite surface.

Static contact angles on a substantially flat flexible graphite surface (without micro-texturing) were found to be in the range between and inclusive of about 73°-77°. FIG. 17 is a photograph showing a water droplet on a smooth (untextured) portion of a flexible graphite surface. In this case the water droplet was on an untextured portion of one of the flexible graphite samples that had been micro-textured in other regions, so it had been compressed during the embossing process with a flat part of the silicon wafer die. The static contact angle is about 73°.

Contact angle measurements were measured and compared for some of the samples of micro-textured materials that were successfully prepared as described above.

The contact angles measured for flexible graphite micro-textured with the smallest features (for example, protruding features or islands having width or diameter of 10 μm) were almost unchanged from the flat surface. Poor resolution and non-sharp corners were likely to blame. It is postulated that, without a sharp edge, the droplet can simply slide over the edge and up the next feature. Contact angles for droplets on the micro-textured array of small features were in the range between and inclusive 65-70°. Increasing the spacing (25, 50, and 100 μm gaps) between the mid-size and large protruding features tended to reduce the contact angle (decrease hydrophobicity). Large contact angles were observed for the samples micro-textured using die array #3-A or 3-B (where the flexible graphite is micro-textured with an array of 50×50 μm square protrusions with 10 μm spacing between these features) which were measured to be in the range between and inclusive of 90° to 130° depending on the location within the measured sample.

Figure 18:
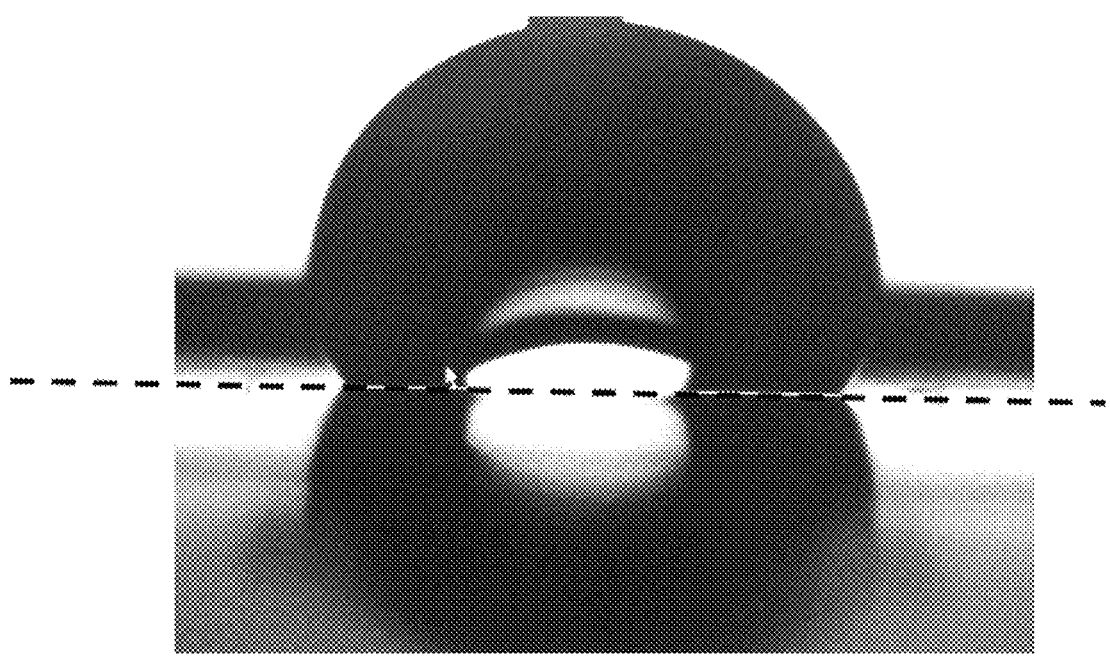
FIG. 18 is a photograph showing a water droplet on a micro-textured flexible graphite surface.

FIG. 18 is a photograph showing a water droplet on a micro-textured flexible graphite surface. The surface was micro-textured using die array #4-A with an array of 500× 500 μm square protrusions, height 4.5 μm, with 10 μm spacing between protrusions. The advancing contact angle for this material was determined to be at least 130°.

Figure 19:
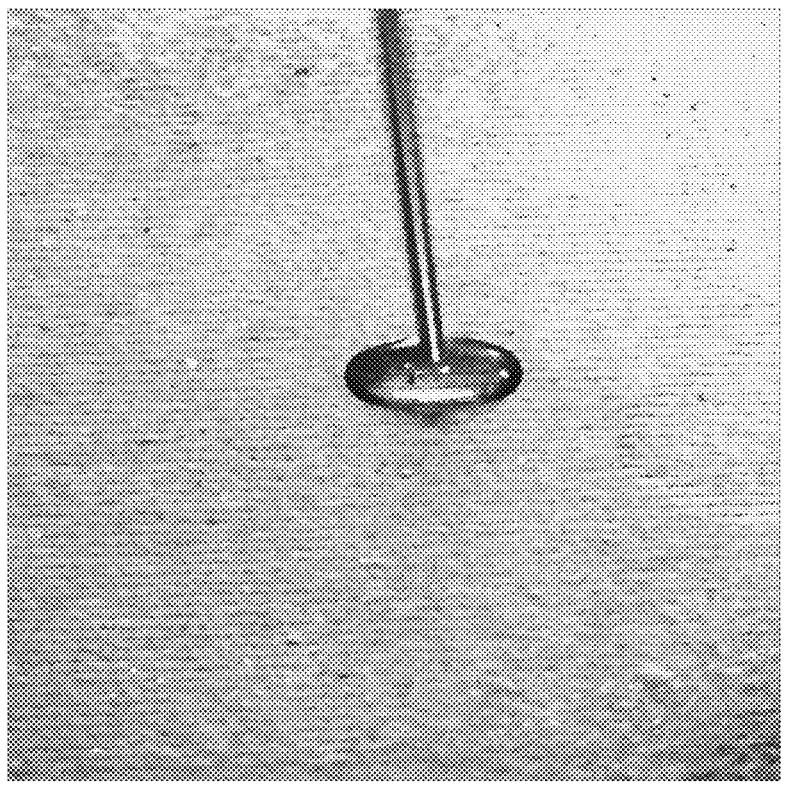
FIG. 19 is a photograph showing a water droplet on a micro-textured flexible graphite surface.

For the sample of flexible graphite micro-textured with parallel grooves/ribs, the droplet was pinned by grooves/ribs from spreading in one in-plane dimension, but not pinned in the orthogonal in-plane dimension, leading to an oval shaped droplet as shown in FIG. 19, which shows a photograph of a droplet on micro-textured flexible graphite embossed with protruding ribs having a width of 250 μm and a spacing of 50 μm, using die #15-B.

It is believed that features with substantially vertical side walls (perpendicular to plane of the material) and sharp corners can enhance hydrophobicity. For the micro-texturing to render the material more hydrophilic, it can be beneficial that the features have sloping side walls and/or more rounded corners.

Micro-Texturing Flexible Graphite Using Etching

Another process that can be used to micro-texture the surface of flexible graphite, rather than embossing, is to use photolithography and etching techniques. For example, a photoresist material can be applied to flexible graphite substrate, then the coated flexible graphite substrate can be exposed to UV light through a photomask then treated with a developer. In the case of a negative photoresist, the developer removes the regions that were not exposed to light, leaving behind a coating in areas where the mask was not placed. In the case of a positive photoresist, the developer removes regions that were exposed to light, leaving behind a coating where the mask was placed. Then the exposed graphite surface can be selectively etched away with a suitable etchant, so that a reverse pattern is formed in the surface of the flexible graphite. The photoresist material can then be removed, if desired, to yield micro-textured flexible graphite. A sample of flexible graphite has been successfully etched in this manner to produce a micro-textured surface.

Micro-Texturing Other Graphite Materials

Other graphite materials can be micro-textured using the processes and apparatus described above in order to impart desired wettability characteristics to the surface of the material. For example, graphene oxide powders, or other graphite powders or graphite particulate materials (including, for example, particulate materials prepared by processing exfoliated graphite particles in a blender to chop up the exfoliated graphite into smaller particles) can be compressed and micro-textured by embossing and/or etching using photolithography techniques, on one or both major surfaces, to form micro-textured materials or articles. Similarly, expanded graphite flakes can be mixed with graphene oxide powders or other particulate graphite materials, and the mixture can be compressed and micro-textured by embossing or etching using photolithography techniques, on one or both major surfaces, to form a micro-textured materials or articles.

In some embodiments, a small amount of a plastic binder and one or more other additives can be added to a particulate graphite material prior to micro-texturing. Such powders or mixtures are not necessarily formed into a sheet material before they are compressed and embossed to form micro-textured surface. In some embodiments, the loose powder or mixture can be placed in a ram cavity and then micro-textured using a single or multi-step embossing process, such as described above. In some embodiments, graphene oxide powders and powder coatings (with particle sizes in the range between and inclusive of 200-500 nm) can be successfully pre-compressed to form a self-supporting sheet material with a smooth surface. In some embodiments, this sheet material can be micro-textured using embossing process(es) as described herein. In some embodiments, micro-textured flexible graphite can be prepared by pre-compressing and then embossing loose graphite flakes having particle sizes in the range between and inclusive of 15-50 µm.

Micro-Textured Graphite-Resin Composite Materials

For some end-use applications, it is desirable to impregnate the micro-textured graphite sheet material, devices, components made therefrom, and/or portions thereof, with a resin after micro-texturing. In some embodiments a methacrylate resin can be used. In some embodiments, it can be desirable to impregnate graphite devices after they are formed or shaped, for example, to enhance their strength and rigidity, and/or to render them more durable.

Various known techniques can be used for resin impregnation. For example, in some embodiments, a suitable resin can be prepared, and a micro-textured graphite material, part and/or device can be placed in a vessel and subjected to a vacuum. The resin can then be introduced into the vessel under vacuum. The pressure can then be increased to facilitate impregnation of the resin into the material, part and/or device. It can then be removed from the vessel, excess resin can be washed off, and then it can be rinsed. In some embodiments, the resin can then be cured, for example, by heating.

In some embodiments, the effect of micro-texturing of the surface of the flexible graphite is fully retained in the resin-impregnated material. In some embodiments, the effect of the micro-texturing of the surface of the flexible graphite is substantially retained in the resin-impregnated material. In some embodiments, the effect of the micro-texturing of the surface of the flexible graphite is only partially retained in the resin-impregnated material.

In some embodiments, micro-texturing of the flexible graphite surface can be used specifically to facilitate a subsequent resin-impregnation step by enhancing the wettability or "impregnate-ability" of the material with a particular resin. In some such embodiments, the effect of the micro-texturing of the surface of the flexible graphite may or may not be retained in the resin-impregnated material.

Rather than micro-texturing flexible graphite that does not contain resin, and then introducing a resin into the micro-textured material, in some embodiments, a graphite/resin mixture comprising graphite particles (such as, for example, expanded graphite particles) and a resin can be formed into a dry, compressible sheet material or a paste or dough (depending on whether the resin is a solid or a liquid). In some embodiments, this material, paste or dough can then be surface-textured, for example, by embossing as described herein. In some embodiments, the resin can then be cured. Thus, a surface-textured graphite-resin composite material can be prepared.

Coated Micro-Textured Graphite

For some end-use applications, it is desirable to coat the micro-textured flexible graphite, devices and/or components made therefrom, with a coating. Such a coating can be a single layer or multiple layers.

In some embodiments, micro-texturing of the flexible graphite surface can be used specifically to facilitate a coating process by enhancing the wettability or "coat-ability" of the material with a particular coating. In some embodiments, depending on the thickness of the coating, the residual effect of the micro-texturing on the coated flexible graphite can be reduced, and in some cases can be minimal or insignificant. For example, in some embodiments, the coating can partially or fully fill the cavities defined by and/or in between the surface features, so that the coated surface is substantially flat or smooth.

In some embodiments, it is desirable to retain at least some of the effect of the micro-texturing of the surface of the flexible graphite in the coated material. In these cases, the thickness of the coating is preferably much smaller than the dimensions of the surface features or micro-texturing. For example, in some embodiments the surface features in the uncoated, micro-textured flexible graphite can have features with dimensions (for example, depth/height, width/length or diameter and/or spacing) in the range between and inclusive of 5 µm to 100 µm, and the coating has a thickness that is less than 1 µm. In some embodiments the thickness of the coating is less than about 10% of the smallest feature dimensions and/or spacing.

As well as the micro-texturing, the nature and chemical composition of coating generally also affects the wettability characteristics of the coated, micro-textured flexible graphite, and the coating can be selected accordingly.

In some embodiments, the coating can be selected to be thermally conductive so as not to significantly adversely affect the thermal characteristics of the material or device. In some embodiments, such as particular electronics applications or environments, the coating can be selected to be substantially non-electrically conducting, thereby providing electrical isolation between components and preventing, or at least reducing, voltage leakages between electronic circuit components and/or the electronic system's environment. In some embodiments, a coating can also be used to reduce the likelihood of small particles of graphite flaking off or being abraded from the surface of the component and causing short-circuits or other problems.

In some embodiments, a coating can be used to reduce the permeability of graphite materials to fluids, for example, in heat exchanger or fuel cell applications. For example, in some embodiments, a coating can be used to inhibit hydrogen permeation and/or inhibit water/coolant absorption. In some embodiments, a coating can be used to enhance the rigidity or durability of the graphite components. Yet another type of coating is one that provides chemical resistance.

Depending on the purpose, suitable coating materials that can be used include, but not are limited to, epoxies, silicones, urethanes, and other resins. Suitable application methods or processes can include, but are not limited to, sprays, chemical vapor deposition, and vacuum impregnation.

Parylene is the trade name for poly(p-xylene) polymers that can be deposited on a surface, via a chemical vapor deposition process. For some applications, parylene can be used as a moisture and dielectric barrier. Parylene C is popular owing to a number of advantages including barrier properties and cost. In some embodiments, a coating including parylene C can be an ultra-thin coating that provides a dielectric barrier to a graphite substrate. In some embodiments, the vapor deposition process can provide control of layer thickness. In some embodiments the film thickness can range from a few angstroms to about and including 75 microns.

Applications of Micro-Textured Flexible Graphite

Micro-textured flexible graphite can be used in many applications where it comes into contact with water or other liquids, including, but not limited to, fuel cells, thermal products, heat exchangers, micro-electro-mechanical, systems (MEMS), optoelectronics, biomedical, and micro-packaging applications. In some embodiments, the approach described herein can be used to selectively modify or tune the surface characteristics of flexible graphite components used in these applications to provide the desired properties, for example, with respect to wetting and water mobility. For some applications, flexible graphite components or devices can be selectively micro-textured with different texturing patterns in different regions in order to impart different wettability characteristics in different regions of the component or device.

Fuel Cell Applications

The ability to be able to modify the wettability characteristics of flexible graphite surfaces (and/or the forces required to move droplets on those surfaces) has practical applications in fuel cells. Fuel cells generally have an anode and a cathode separated by an electrolyte. The anode and cathode are generally porous and each comprise a catalyst. Multiple cells can be connected in series to form a fuel cell stack. In PEM fuel cells, the anode, cathode, and electrolyte are often combined in a membrane electrode assembly. Fuel is generally supplied to the anode and oxidant to the anode via flow field plates or bipolar plates. The fuel is oxidized at the anode, generating electrical power, with water and heat produced as by-products.

Water management can be a challenge in fuel cell operation. Product water can accumulate in the flow channels or other regions of the cell and can restrict or block the flow of reactants to the electrodes. Such a condition is known in the art as "flooding". In addition, the temperature differences can cause condensation of water vapor within the fuel cell during operation.

Typically, at least one surface of the flow field plates is provided with reactant flow channels, and product water is also directed through the channels to a collection area to be drained from the cell. In addition, the flow field plates are often made from material having relatively low surface energy so water drains from the plate more easily. Neither of these measures has been entirely successful in eliminating cathode flooding and water management problems in fuel cells, however. Even where low surface energy materials such as PTFE are used in fuel cells, water droplets can cling to flow field plates and other surfaces in the cell rather than draining away as desired.

Flexible graphite used, for example as a flow field plate and/or electrode, in fuel cells can be rendered more hydrophobic by micro-texturing. The flexible graphite can be micro-textured all over one or both major surfaces or just in selected locations, for example, where accumulation and/or condensation of water tends to occur and/or would be particularly problematic. For example, different texturing can be used to retain water droplets near the inlet and shed them with low forces near the outlet. In some embodiments, this can also impact freeze start by moving water away from critical areas during freezing and reduce the chances of blockage. In at least some embodiments, the high degree of repellency of the micro-textured surfaces can inhibit the tendency of water droplets to cling to the surface, thereby significantly improving water management within the cell.

In some embodiments, where flexible graphite components, such as flow field plates, are produced using compression molding or sheet embossing manufacturing processes, a micro-textured surface can be formed during their manufacture by texturing tooling surfaces that are used to form the plates, even at the same time as macro features are also being embossed. For example, in some embodiments, flexible graphite flow field plates can be embossed with reactant flow channels, and the surface of the landings between the flow channels could be micro-textured during the reactant channel embossing processes (or in a separate step). Micro-texturing the surface of the landings can advantageously enhance gas or fluid diffusion or access under the landings between the stacked layers, for example, between the flow field plate and an adjacent gas diffusion layer during operation of the fuel cell.

In at least some embodiments, increased hydrophobicity by micro-texturing flexible graphite surfaces in fuel cell components, such as flow field plates, can decrease demands on gas flow and purge gas pressures needed during operation to overcome surface tension adhesion forces between water and plate surfaces. Decreasing the shear forces required by flowing gases in order to effect water displacement in a fuel cell can improve stack performance, it can also result in stack control system component cost savings by decreasing complexity and packaging requirements. Improving water management by using surface micro-texturing can also expand plate feature design windows for even further performance benefits. For example, micro-textured flexible graphite surfaces with low surface energy can result in smaller droplet formation, which can in turn allow for smaller plate feature designs (such as channel width) since capillary forces also tend to be reduced. Reduced capillary forces can result in less ability for water deposits to wick back up into plate features, which can otherwise be problematic.

Figure 20:
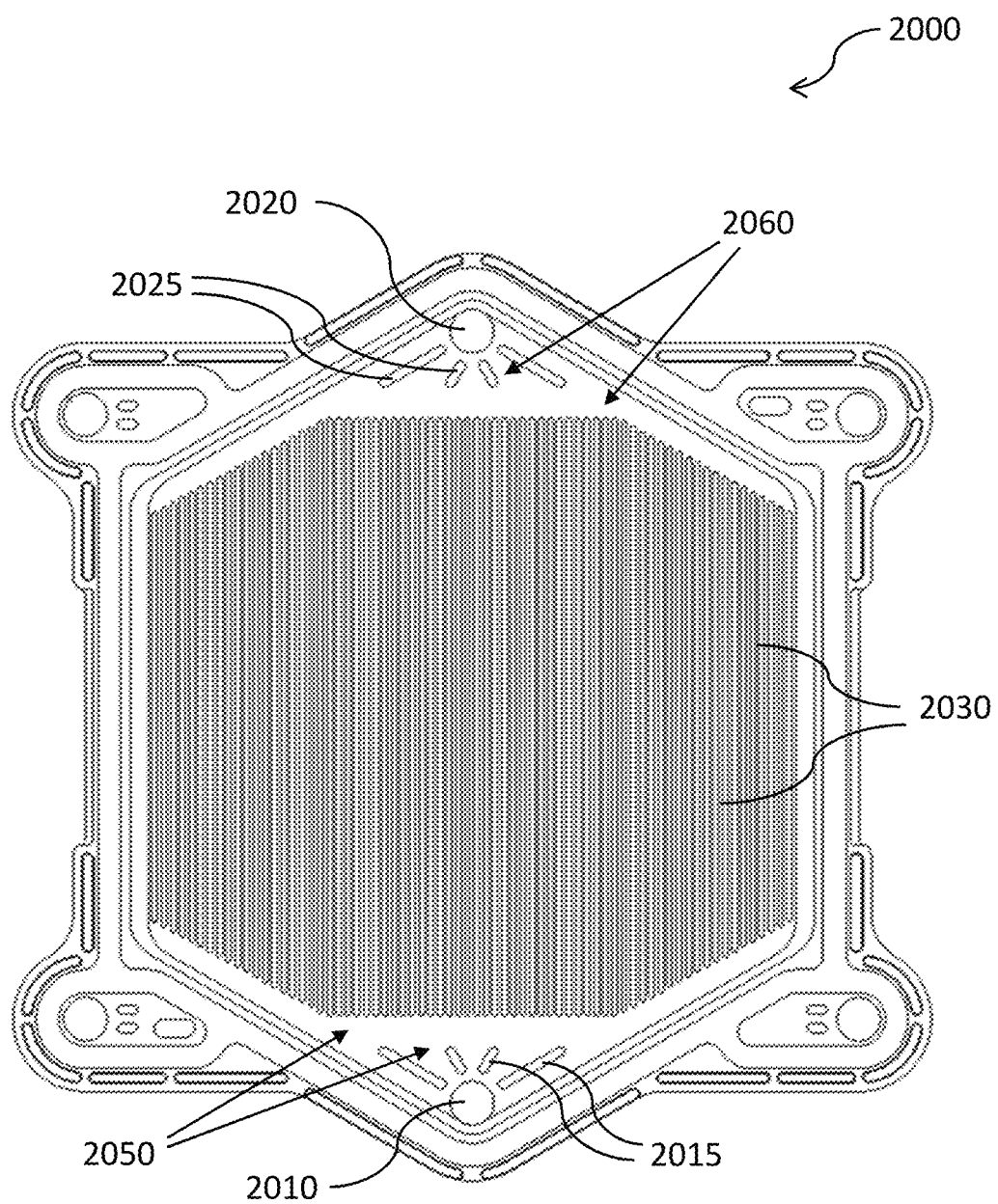
FIG. 20 illustrates an embodiment of a fuel cell flow field plate made by embossing flexible graphite, and indicates portions of the surface of the plate that can be advantageously micro-textured to modify the surface properties.

FIG. 20 illustrates one major surface of an example of an embossed flexible graphite flow field plate 2000, having reactant inlet port 2010, reactant outlet port 2020 and embossed reactant flow field channels 2030 that, in operation of a fuel cell, fluidly connect inlet 2010 to outlet 2020. Flow field plate 2000 also has embossed ribs 2015 in the inlet region and embossed ribs 2025 in outlet region, respectively, for supporting an adjacent membrane-electrode assembly (not shown) and directing the reactant stream. In some embodiments, it is advantageous to modify the surface properties (e.g. wettability) of the flexible graphite in selected regions of fuel cell plate 2000 by micro-texturing. For example, in some embodiments, the plate 2000 can be micro-textured in regions between ribs 2015 as indicated by arrows 2050, and/or in regions between ribs 2025 as indicated by arrows 2060. Plate 2000 can also be micro-textured on the surfaces of the reactant flow channels 2030, and/or on top of the landings or ribs between the channels. In some embodiments, the micro-texturing applied can be different in one region than another.

Heat Exchange and Other Applications

Micro-textured flexible graphite can be advantageously used in various heat exchange applications, including in radiators, other types of heat exchangers and in refrigeration systems.

In some heat exchangers or radiators, condensation and accumulation of liquid water on fins or other heat dissipation surfaces can reduce the capability of the surface to dissipate heat, and reduce the thermal performance of the device. Similarly, for heat sink fins that are used in a moist environment, water condensation can reduce performance. By using flexible graphite for heat dissipation components, and micro-texturing the flexible graphite surface as described herein, the hydrophobicity can be increased such that water droplets tend to bead and drop off the surface.

In some systems, for example those that rely on evaporative cooling, it can be advantageous for water to spread and form a film on the surface of a component. In at least some of these situations, it can be advantageous to use flexible graphite components that are micro-textured in a manner that increases the hydrophilicity of the surface.

Figure 21:
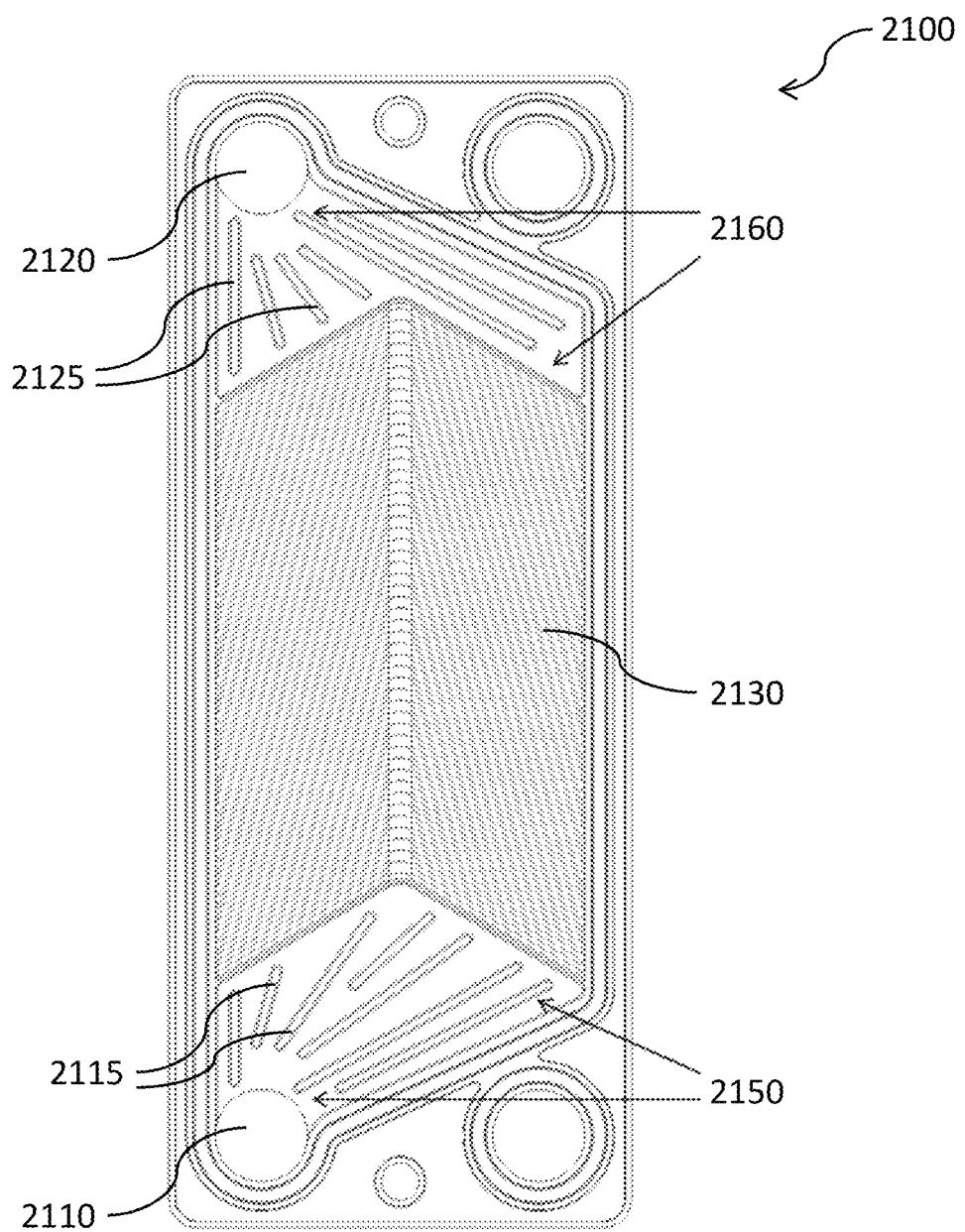
FIG. 21 illustrates an embodiment of a heat exchanger plate made by embossing flexible graphite, and indicates portions of the surface of the plate that can be advantageously micro-textured to modify the surface properties.

FIG. 21 illustrates one major surface of an example of heat exchanger plate 2100, having fluid inlet port 2110, fluid outlet port 2120 and embossed fluid flow field channels 2130 that, in operation of a stacked plate-to-plate heat exchanger, fluidly connect inlet 2110 to outlet 2120. In some embodiments, heat exchanger plate 2100 also has embossed ribs 2115 in the inlet region and embossed ribs 2125 in the outlet region, respectively, for directing the fluid stream and supporting the plate. In some embodiments, it can be advantageous to modify the surface properties (e.g. wettability) of the flexible graphite in selected regions of heat exchanger plate 2100 by micro-texturing. For example, in some embodiments, the plate can be micro-textured in regions between ribs 2115 as indicated by arrows 2150, and/or in regions between ribs 2125 as indicated by arrows 2160. In some embodiments, the nature of the micro-texturing that is applied can be different in one region than another, in order to impart the desired surface properties to each particular region.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for making a material or an article, said method comprising micro-texturing at least a portion of at least one major surface of a flexible graphite material with an array of features and forming said material or said article into a component of a fuel cell, wherein at least one dimension of said array of features and/or a spacing between features in said array of features is less than 100 µm, the component of the fuel cell comprises a flow field plate comprising flow channels, and the array of features is within the flow channels.

2. The method of claim 1 wherein at least one dimension of said array of features or a spacing between features in said array of features is in the range between and inclusive of 10 µm to 100 µm.

3. The method of claim 1 wherein at least one dimension of said array of features or a spacing between features in said array of features is in the range between and inclusive of 10 µm to 50 µm.

4. The method of claim 1 wherein a depth or a height of said array of features is in the range between and inclusive of 15 µm to 50 µm and a spacing between features in said array of features is in the range between and inclusive of 15 µm to 25 µm.

5. The method of claim 1 wherein said micro-texturing comprises embossing said at least a portion of said at least one major surface of said flexible graphite material with said array of features.

6. The method of claim 1 wherein said micro-texturing comprises embossing said at least a portion of said at least one major surface of said flexible graphite material using a die.

7. The method of claim 1 wherein said micro-texturing comprises embossing said at least a portion of said at least one major surface of said flexible graphite material using a wafer die.

8. The method of claim 1 wherein said micro-texturing comprises embossing said at least a portion of said at least one major surface of said flexible graphite material using a roller embossing device.

9. The method of claim 1 wherein said micro-texturing increases the hydrophobicity of said at least a portion of said at least one major surface of said flexible graphite material.

10. The method of claim 1 wherein the contact angle of a water droplet on said flexible graphite material prior to said micro-texturing is less than 70°, and the contact angle of a water droplet on said at least a portion of said at least one major surface of said flexible graphite material that is micro-textured with said array of features is greater than 90°.

11. The method of claim 1 wherein said method further comprises, prior to said micro-texturing, reducing the roughness of said at least a portion of said at least one major surface of said flexible graphite material by pressing said flexible graphite material against a smooth surface.

12. The method of claim 1 wherein said flexible graphite material consists essentially of graphite.

13. The method of claim 1 wherein said flexible graphite material comprises a resin.

14. A method for making a material or an article, said method comprising embossing at least a portion of at least one major surface of a flexible graphite material with an array of features, using a roller embosser patterned with said array of features or a die patterned with said array of features, and forming said material or said article into a component of a fuel cell wherein at least one dimension of said array of features and a spacing between features in said array of features are less than 100 µm, the fuel cell comprises a flow field plate comprising flow channels, and the array of features is within the flow channels.

* * * * *